US009883159B2

United States Patent
Fink et al.

(10) Patent No.: US 9,883,159 B2
(45) Date of Patent: Jan. 30, 2018

(54) CAMERA TO MINIMIZE PARALLAX EFFECTS

(71) Applicant: VideoStitch Inc., San Francisco, CA (US)

(72) Inventors: Alexander Fink, San Jose, CA (US); Nicolas Burtey, Mountain View, CA (US); George Haber, Los Altos Hills, CA (US); Stéphane Valente, Paris (FR)

(73) Assignee: VIDEOSTITCH INC., San Francisco, CA (US)

( * ) Notice: Subject to any disclaimer, the term of this patent is extended or adjusted under 35 U.S.C. 154(b) by 214 days.

(21) Appl. No.: 15/007,599

(22) Filed: Jan. 27, 2016

(65) Prior Publication Data
US 2017/0188005 A1 Jun. 29, 2017

Related U.S. Application Data

(63) Continuation-in-part of application No. 14/982,191, filed on Dec. 29, 2015.

(51) Int. Cl.
| | |
|---|---|
| *H04N 13/00* | (2006.01) |
| *G02B 13/06* | (2006.01) |
| *G02B 7/02* | (2006.01) |
| *H04N 5/232* | (2006.01) |
| *H04N 5/247* | (2006.01) |
| *H04N 5/265* | (2006.01) |

(52) U.S. Cl.
CPC ......... *H04N 13/0022* (2013.01); *G02B 7/021* (2013.01); *G02B 13/06* (2013.01); *H04N 5/23238* (2013.01); *H04N 5/247* (2013.01); *H04N 5/265* (2013.01)

(58) Field of Classification Search
CPC .... H04N 5/23238; H04N 5/247; H04N 5/268; H04N 13/0022; G02B 7/021; G02B 13/06
See application file for complete search history.

(56) References Cited

U.S. PATENT DOCUMENTS

2016/0352982 A1* 12/2016 Weaver .............. H04N 5/23238
2017/0295318 A1* 10/2017 MacMillan ........ H04N 5/23238

OTHER PUBLICATIONS

Fraunhofer, "Watch and Listen in 360 Degree", https://www.youtube.com/watch?v=ITamafIlyFE, Oct. 22, 2015, 1 page.

(Continued)

*Primary Examiner* — Tuan Ho
(74) *Attorney, Agent, or Firm* — Christopher P. Maiorana, PC

(57) ABSTRACT

An apparatus comprising a plurality of lenses and a frame. The plurality of lenses may be arranged to provide coverage for a spherical field of view of a scene surrounding the apparatus and each have an optical axis directed to provide coverage for a respective area of the spherical field of view. The frame may be configured to hold a first subset of the plurality of lenses and a second subset of the plurality of lenses. At least one of the lenses in the first subset and at least one of the lenses in the second subset are neighboring lenses. An orientation of at least two of the neighboring lenses is configured to reduce parallax effects when the spherical field of view is recorded using the plurality of lenses. The parallax effects are reduced by configuring the optical axes of the neighboring lenses to not intersect.

20 Claims, 15 Drawing Sheets

(56) References Cited

OTHER PUBLICATIONS

Ricoh, "Ricoh Unveils Industry's Most Advanced Fully Spherical Portable Camera: RICOH THETA S", Sep. 8, 2015, pp. 1-5.
Ricoh, "New RICOH THETA Model, Capturing 360-Degree Images in One Shot, is on Sale Soon", Oct. 28, 2014, pp. 1-5.
Point Grey, "Camera Compatibility with M12 Microlenses", https://www.ptgrey.com/KB/10088, Jun. 21, 2016, 3 pages.
Guirgis, C., "The GoPro 360 Degree Camera Array Shoots 3D Footage Using 16 Cameras", http://www.trendhunter.com/trends/gopro-360-degree-camera, May 29, 2015, 3 pages.
Ganesh, T.S., "Zotac ZBOX MAGNUS EN970 Review—A Gaming mini-PC Done Right", http://www.anandtech.com/Show/9660/zotac-zbox-magnus-en970-review-a-gaming-minipc-done-right, Sep. 28, 2015, 2 pages.
IMX123LQT, "Diagonal 6.46 mm (Type 1/2.8) Approx. 3.21 M-Effective Pixel Color CMOS Image Sensor", http://www.sony.net/Products/SC-HP/new_pro/june_2014/imx123_e.html, Apr. 2014, 4 pages.
Weissig, Christian, et al., "The Ultimate Immersive Experience: Panoramic 3D Video Acquisition", Jan. 2012, 11 pages.
Satoh, Hiroyuki, "Front Runner—Value Creation to Defy Common Wisdom Spawned through Belief, Tenacity, and Global, then 'Heated Arguments with Colleagues'", Front Runner /Technology / Ricoh Global, https://www.ricoh.com/technology/rd/f_runner/new/fr13, Oct. 2014, 4 pages.

\* cited by examiner

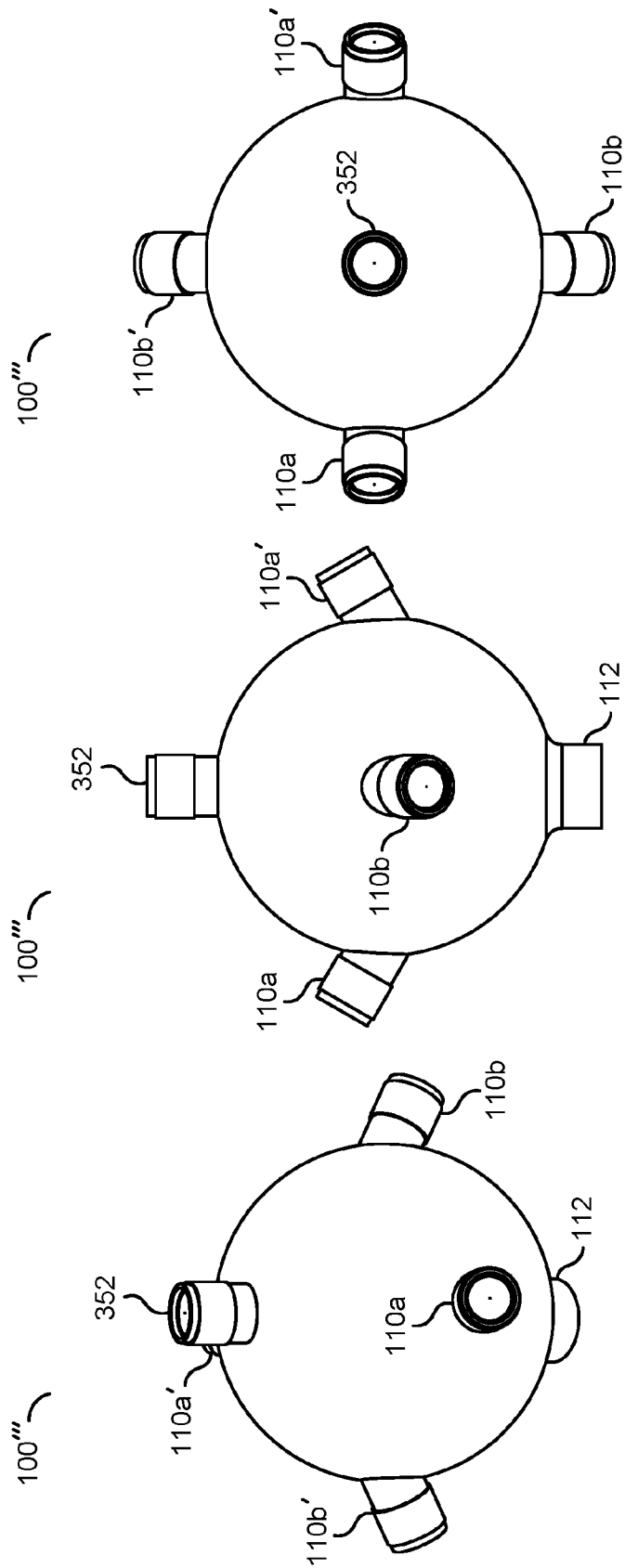

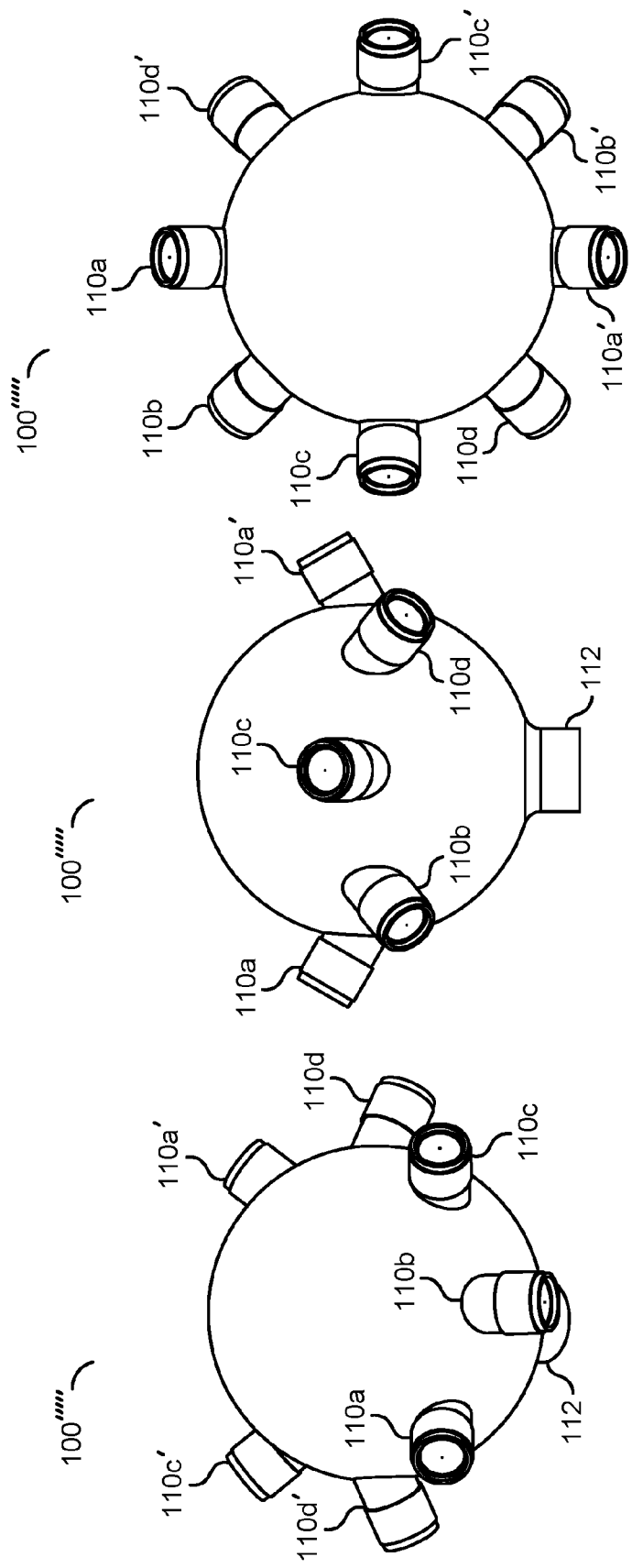

US 9,883,159 B2

CAMERA TO MINIMIZE PARALLAX EFFECTS

This application relates to U.S. Ser. No. 14/982,191, filed Dec. 29, 2015, which relates to U.S. Ser. No. 14/982,236, filed Dec. 29, 2015, each of which are hereby incorporated by reference in their entirety.

FIELD OF THE INVENTION

The invention relates to an optical assembly generally and, more particularly, to a method and/or apparatus for implementing an optical assembly for an omnidirectional camera that may minimize parallax effects.

BACKGROUND

Conventional omnidirectional cameras (also known as virtual reality cameras, spherical cameras, panorama cameras, immersive video cameras, or 360 cameras) present design challenges. The purpose of omnidirectional cameras is to capture video in all directions surrounding the camera (i.e., 360 degrees in each axis). The video captured represents a complete view of a scene surrounding the person watching the video. A user typically uses a head-mounted display or an interactive video player to view the captured video on playback. The video orientation can be changed in any direction during playback.

The video provides the user with a spherical field of view of the scene surrounding the omnidirectional camera. A single lens cannot capture an entire spherical field of view. Conventional solutions include placing a convex mirror in front of the lens or capturing images from multiple lenses for several separate video signals. Using a mirror only provides a 360 degree horizontal coverage, while losing the top and bottom of the spherical field of view. When using multiple lenses, the multiple images are stitched together into a 360 degree intermediate representation. The multiple images need to have sufficient overlap so that overlapping areas can be blended together to offer a continuous and smooth representation of the scene surrounding the camera.

When multiple images are stitched together, the parallax of objects viewed by different cameras can create artifacts on the blended/overlapping areas. The parallax occurs because the objects are viewed differently (i.e., at different relative positions) by each camera. Blending artifacts are visible when viewing the spherical field of view and create a distraction from the user experience.

To avoid parallax related artifacts, two theoretical alternative conditions may be implemented. In one theoretical implementation for reducing parallax related artifacts, all objects are viewed (e.g., captured images) at a sufficient distance (e.g., theoretically an infinite distance). Viewing the objects at the sufficient distance may nullify the parallax related artifacts. However, an infinite viewing distance is not realistic in real camera implementations. In another theoretical implementation, a center of projection (e.g., a focal point, an optical center and/or convergence point) of all cameras share the same physical location. The center of projection may be a point at which initially collimated rays of light meet after passing through a convex lens. Generally, multiple cameras sharing the same location for the centers of projection may not be physically possible, because the center of projection of each camera is located somewhere between a lens and a sensor of the camera inside each camera module. The volume of space physically occupied by the cameras should intersect so that the respective focal points coincide (or at least be close to one another).

It would be desirable to implement an omnidirectional camera to minimize parallax effects.

SUMMARY

The invention concerns an apparatus comprising a plurality of lenses and a frame. The plurality of lenses may be arranged to provide coverage for a spherical field of view of a scene surrounding the apparatus and each have an optical axis directed to provide coverage for a respective area of the spherical field of view. The frame may be configured to hold a first subset of the plurality of lenses and a second subset of the plurality of lenses. At least one of the lenses in the first subset and at least one of the lenses in the second subset are neighboring lenses. An orientation of at least two of the neighboring lenses is configured to reduce parallax effects when the spherical field of view is recorded using the plurality of lenses. The parallax effects are reduced by configuring the optical axes of the neighboring lenses to not intersect. In some embodiments, the parallax effects are reduced by positioning a center of projection of each of the plurality of lenses close to a common location.

BRIEF DESCRIPTION OF THE FIGURES

Embodiments of the invention will be apparent from the following detailed description and the appended claims and drawings in which:

FIG. 17 is a diagram illustrating a perspective view of an example spherical omnidirectional camera;

FIG. 18 is a diagram illustrating a side view of the example spherical omnidirectional camera;

FIG. 19 is a diagram illustrating a top view of the example spherical omnidirectional camera;

FIG. 23 is a diagram illustrating a perspective view of an example 8-lens spherical omnidirectional camera;

FIG. 24 is a diagram illustrating a side view of the example 8-lens spherical omnidirectional camera; and FIG. 25 is a diagram illustrating a top view of the example 8-lens spherical omnidirectional camera.

DETAILED DESCRIPTION OF THE EMBODIMENTS

Embodiments of the invention include providing a camera that may (i) capture a spherical field of view, (ii) minimize parallax effects, (iii) be implemented without mirrors, (iv) reduce a volume of the omnidirectional camera, (v) implement an arrangement such that centers of projection of neighboring lenses are close to a common location, (vi) capture image data for video processors, (vii) implement an arrangement of lenses such that optical axes of neighboring lenses that have a largest area of overlap do not intersect, (viii) implement a compact design and/or (ix) be implemented using a plurality of lenses.

Figure 1:
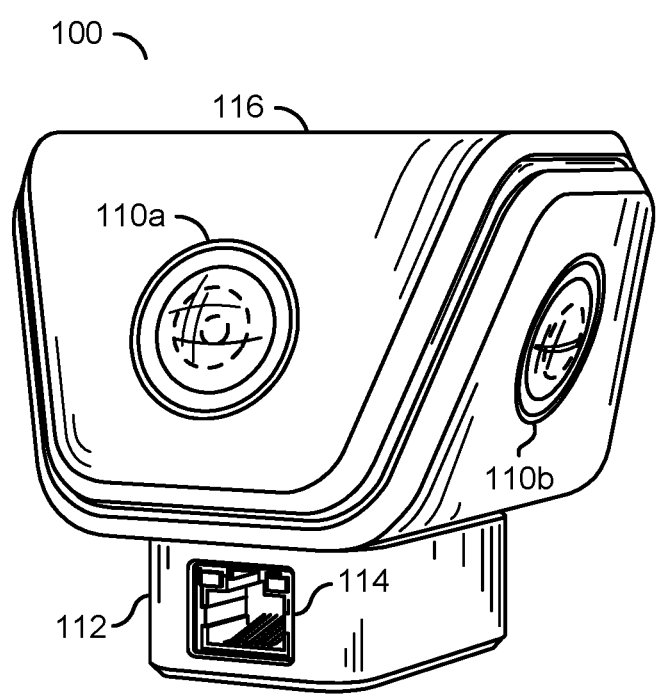
FIG. 1 is a diagram illustrating an example embodiment of an omnidirectional camera.

Referring to FIG. 1, a diagram of a camera 100 is shown in accordance with an embodiment of the invention. The camera 100 may be an omnidirectional camera. The omnidirectional camera 100 is shown having a first lens 110a, a second lens 110b, a neck 112, an interface 114 and a frame 116. The embodiment shown in FIG. 1 shows the lenses 110a and 110b. More lenses may be implemented. Each of the lenses (e.g., 110a, 110b, etc.) of the omnidirectional camera 100 may be part of a subset of the lenses. The omnidirectional camera 100 may implement two subsets of lenses. For example, the lens 110a may be part of one subset of the lenses and the lens 110b may be part of another subset of the lenses. Generally, a lens in one subset (e.g., the lens 110a) is a neighboring lens of a lens in the other subset (e.g., the lens 110b). For example, the lens 110a and the lens 110b may be neighboring lenses.

The frame (or casing) 116 may be configured to secure (or hold) the lenses 110a and 110b (and other additional lenses). For example, the lenses (e.g., 110a, 110b, etc.) may be arranged to provide coverage for a spherical field of view of a scene surrounding the omnidirectional camera 100. In another example, the frame 116 may comprise a cover and a core (e.g., a solid core) inside the camera 100 configured to secure the lenses 110a and 110b (and other additional lenses). In some embodiments, the lenses may each cover a field of view that when stitched together provide a scene surrounding the camera 100 in all directions. The neck 112 may provide a mounting interface. For example, a bottom of the neck 112 may provide mechanical connections to mount the camera 100 on a tripod (or other type of stand).

The omnidirectional camera 100 may reduce (e.g., minimize) parallax effects between lenses by making respective focal points of the lenses (e.g., centers of projection) closer to a common location. In an example, each of the lenses 110a-110a' and 110b-110b' includes a lens barrel. The lens barrels may be entangled (or interwoven). The centers of projection of the lens barrels may be closer to a common location by entangling the lens barrels. The assembly 100 may be implemented without mirrors. Implementing the assembly 100 without mirrors may reduce a fragility of the assembly 100.

In an example implementation, four cameras may be implemented (e.g., one camera associated with the lens 110a, another camera associated with the lens 110b and two other cameras not shown from the perspective illustrated in FIG. 1). The assembly 100 may pair opposite cameras two by two, set them back to back, and assemble both pairs orthogonally. The cameras may be tilted to further minimize the distances of the centers of projection from one camera to the other (e.g., move closer to a common location). Generally, the neighboring lenses (e.g., the lens 110a and the lens 110b) may be arranged to reduce the amount of distance between the centers of projection since neighboring lenses may capture a largest amount of overlapping regions in a final stitched view (e.g., the spherical field of view). The largest overlapping regions may cause the greatest amount of artifacts due to parallax effects.

Figure 2:
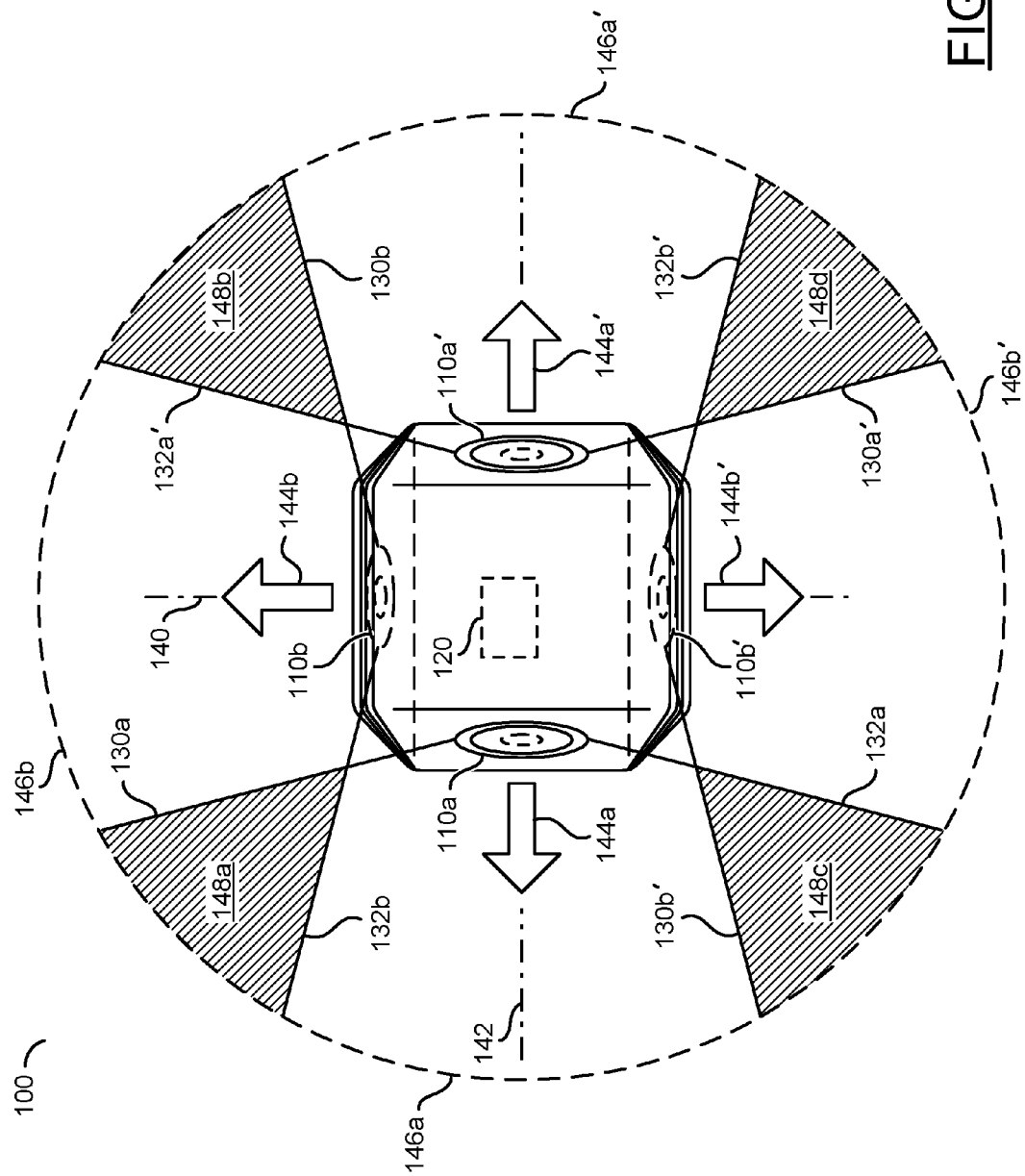
FIG. 2 is a diagram illustrating a top view of the example omnidirectional camera embodiment.

Referring to FIG. 2, a top view of the omnidirectional camera 100 is shown. The top view of the omnidirectional camera 100 shows the lenses 110a and 110a' (e.g., the lenses 110a-110a' and 110b-110b' in one subset of the lenses), the lenses 110b and 110b' (e.g., the lenses 110a-110a' and 110b-110b' in another subset of the lenses) and a block (or circuit) 120. The circuit 120 may comprise various electronic components and/or one or more video processors. For example, the lenses 110a, 110a', 110b and/or 110b' may capture raw data (e.g., light) that may be converted into video frames and processed by the one or more video processors. The configuration of the circuit 120 may be varied according to the design criteria of a particular implementation.

The top view of the omnidirectional camera 100 shows lines extending from the lenses 110a, 110a', 110b, and 110b'. The lines 130a and 132a are shown extending from the lens 110a. The lines 130a and 132a may represent a range of a field of view of the lens 110a. The lines 130a' and 132a' are shown extending from the lens 110a'. The lines 130a' and 132a' may represent a range of a field of view of the lens 110a'. The lines 130b and 132b are shown extending from the lens 110b. The lines 130b and 132b may represent a range of a field of view of the lens 110b. The lines 130b' and 132b' are shown extending from the lens 110b'. The lines 130b' and 132b' may represent a range of a field of view of the lens 110b'. The lines 130a, 130a', 130b, 130b', 132a, 132a', 132b and/or 132b' may be representative examples. The field of view of each of the lenses 110a-110a' and 110b-110b' may be larger than shown. For example, the lenses 110a-110a' and 110b-110b' may be fish-eye lenses capable of capturing a field of view that is nearly 180 degrees when projected onto a horizontal plane.

The top view of the omnidirectional camera 100 shows an axis 140 and an axis 142. The axis 140 and the axis 142 are shown in a 90 degree configuration. The axis 140 and the axis 142 may represent a horizontal plane. The top view of the omnidirectional camera 100 shows an arrow 144a, an arrow 144a', an arrow 144b and an arrow 144b'. The arrows 144a-144a' and 144b-144b' may each represent an optical axis. In FIG. 2, the optical axes 144a-144a' and 144b-144b' are shown projected onto the horizontal plane represented by the axis 140 and the axis 142.

Each of the optical axes 144a-144a' and 144b-144b' may be an axis extending through the center of a corresponding one of the lenses 110a-110a' and 110b-110b'. For example, the lens 110a may have the optical axis 144a, the lens 110a' may have the optical axis 144a', the lens 110b may have the optical axis 110b and the lens 110b' may have the optical axis 144b'. The lenses 110a-110a' and 110b-110b' may be capable of capturing an area having a 180 degree field of view (e.g., fish-eye lenses).

Areas 146a, 146a', 146b and 146b' are shown surrounding the omnidirectional camera 100. The areas 146a, 146a', 146b and 146b' may be associated with one of the lenses 110a-110a' and 110b-110b' (e.g., respective areas). The respective area 146a may be the field of view of the lens 110a ranging from the line 130a to the 132a. The respective area 146a' may be the field of view of the lens 110a' ranging from the line 130a' to the 132a'. The respective area 146b may be the field of view of the lens 110b ranging from the line 130b to the 132b. The respective area 146b' may be the field of view of the lens 110b' ranging from the line 130b' to the 132b'. The respective areas 146a-146a' and 146b-146b' are shown projected onto the horizontal plane defined by the axes 140 and 142. For example, portions of the respective areas 146a-146a' and 146b-146b' may extend above and/or below the lenses 110a-110a' and 110b-110b'.

The respective areas 146a-146a' and 146b-146b' captured by each of the lenses 110a-110a' and 110b-110b' may be based on the respective optical axes 144a-144a' and 144b-144b' (e.g., the optical axes 144a-144a' and 144b-144b' may point to a center of the respective areas 146a-146a' and 146b-146b' captured by the lenses 110a-110a' and 110b-110b'). Generally, the optical axes 144a-144a' and 144b-144b' may be arranged to provide coverage for a spherical field of view of a scene surrounding the omnidirectional camera 100. The spherical field of view may be comprised of the respective areas 146a-146a' and 146b-146b'.

The lens 110a is shown pointed in a direction along the optical axis 144a along the axis 142. Similarly, the lens 110a' is shown pointed in a direction along the optical axis 144a' along the axis 142. In general, the lens 110a and the lens 110a' point in opposite directions along the axis 142 (e.g., the optical axis 144a and the optical axis 144a' point in opposite directions when projected on the horizontal plane defined by the axis 140 and the axis 142). For example, the lens 110a and the lens 110a' may be considered an opposite lens pair. The lenses 110a and 110a' in the opposite lens pair may be one subset of the lenses held by the frame 116 (e.g., each opposite lens pair may be a subset of the lenses).

The lens 110b is shown pointed in a direction along the optical axis 144b along the axis 140. Similarly, the lens 110b' is shown pointed in a direction along the optical axis 144b' along the axis 140. In general, the lens 110b and the lens 110b' point in opposite directions along the axis 140 (e.g., the optical axis 144b and the optical axis 144b' point in opposite directions when projected on the horizontal plane defined by the axis 140 and the axis 142). For example, the lens 110a and the lens 110a' may be considered an opposite lens pair. The lenses 110b and 110b' in the opposite lens pair may be one subset of the lenses held by the frame 116.

In some embodiments, the lens 110a may be neighboring lenses with the lens 110b and neighboring lenses with the lens 110b'. Similarly, the lens 110b may be neighboring lenses with the lens 110a and neighboring lenses with the lens 110a', the lens 110b' may be neighboring lenses with the lens 110a and neighboring lenses with the lens 110a', and the lens 110a' may be neighboring lenses with the lens 110b and neighboring lenses with the lens 110b'. The neighboring lenses (e.g., the lens 110b' and the lens 110a') may be adjacent to each other. The adjacent lenses may be lenses (e.g., the lenses 110a and 110b) whose distance is smaller than, or equal to, any pair of lenses of the omnidirectional camera 100 with respect to one of the lenses (e.g., the lenses 110a and 110b have a distance that is smaller than the distance between the lenses 110a and 110a' and equal to the distance between the lenses 110a and 110b'). For example, with respect to the lens 110a, the adjacent (neighboring) lenses are 110b and 110b' (e.g., the distance from the lens 110a and 110b and 110a and 110b' is equal and less than a distance to the lens 110a').

The optical axis of the neighboring lenses may be implemented in a 90 degree configuration (e.g., orthogonal) when the optical axes 144a-144a' and 144b-144b' of the lenses 110a-110a' and 110b-110b' are projected onto the horizontal plane represented by the axis 140 and the axis 142. However, an angle between opposite lenses (e.g., lenses 110a and 110a', or the lenses 110b and 110b') may be larger (e.g., if the lenses 110a and 110a' or 110b and 110b' are tilted in relation to each other). The particular orientation of the optical axes 144a-144a' and the optical axes 144b-144b' and/or the lenses 110a-110a' and the lenses 110b-110b' may be varied to meet the design criteria of a particular implementation.

The lenses 110b and 110b' may be an opposite lens pair (e.g., one of the subsets of the lenses of the omnidirectional camera 100). The opposite lens pair 110b-110b' may be horizontally opposite lenses. Similarly, the opposite lens pair 110a-110a' may be horizontally opposite lenses. Horizontally opposite lenses may be two lenses (e.g., the lens 110b and the lens 110b' and/or the lens 110a and the lens 110a') having orientations 180 degree apart when projected onto the horizontal plane. In the example shown in FIG. 2, the optical axis 144a and the optical axis 144a' are shown projected onto the horizontal plane defined by the axis 140 and the axis 142.

Generally, the respective areas 146a-146a' and 146b-146b' of the spherical field of view captured by the neighboring lenses (e.g., the lenses 110a and 110b, the lenses 110a and 110b', the lenses 110a' and 110b, etc.) have a large amount of overlap (e.g., an overlap of approximately 45 degrees (or in the range of 40-45 degrees) of horizontal field of view). The large amount of overlap may cause artifacts due to parallax effects after the video stitching operations are performed to create the spherical field of view on video signals captured using the lenses 110a-110a' and 110b-110b'. The large amount of overlap may result in significant artifacts (e.g., artifacts that are distracting to a user viewing the spherical field of view). Generally, the arrangement of the lenses 110a-110a' and 110b-110b' are arranged to reduce the parallax effects caused by the different perspectives of the overlapping areas captured by the neighboring lenses.

Overlapping areas 148a-148d are shown. The overlapping areas 148a-148d may illustrate examples of the overlapping areas of neighboring lenses. The overlapping area 148a is shown between the line 130a associated with the lens 110a and the line 132b associated with the lens 110b. The overlapping area 148a may comprise portions of the respective area 146a and the respective area 146b. The overlapping area 148a may be the overlap between the neighboring lenses 110a and 110b. The overlapping area 148b is shown between the line 130b associated with the lens 110b and the line 132a' associated with the lens 110a'. The overlapping area 148b may comprise portions of the respective area 146b and the respective area 146a'. The overlapping area 148b may be the overlap between the neighboring lenses 110b and 110a'. The overlapping area 148c is shown between the line 130b' associated with the lens 110b' and the line 132a associated with the lens 110a. The overlapping area 148c may comprise portions of the respective area 146a and the respective area 146b'. The overlapping area 148c may be the overlap between the neighboring lenses 110a and 110b'. The overlapping area 148*d* is shown between the line 130*a*' associated with the lens 110*a*' and the line 132*b*' associated with the lens 110*b*'. The overlapping area 148*d* may comprise portions of the respective area 146*a*' and the respective area 146*b*'. The overlapping area 148*d* may be the overlap between the neighboring lenses 110*a*' and 110*b*'.

Other overlapping areas may exist. For example, an overlapping area may exist with respect to the opposite lens pair 110*a*-110*a*'. In another example, an overlapping area may exist with respect to the opposite lens pair 110*b*-110*b*'. Generally, the overlapping area with respect to the opposite lens pairs (e.g., the lens pairs 110*a*-110*a*' and/or 110*b*-110*b*') may be small compared to the overlapping areas 148*a*-148*d*. The size of the overlapping areas 148*a*-148*d* may varied according to the design criteria of a particular implementation. Generally, reducing an amount of the overlapping areas 148*a*-148*d* reduces visual artifacts when viewing the spherical field of view.

Figure 3:
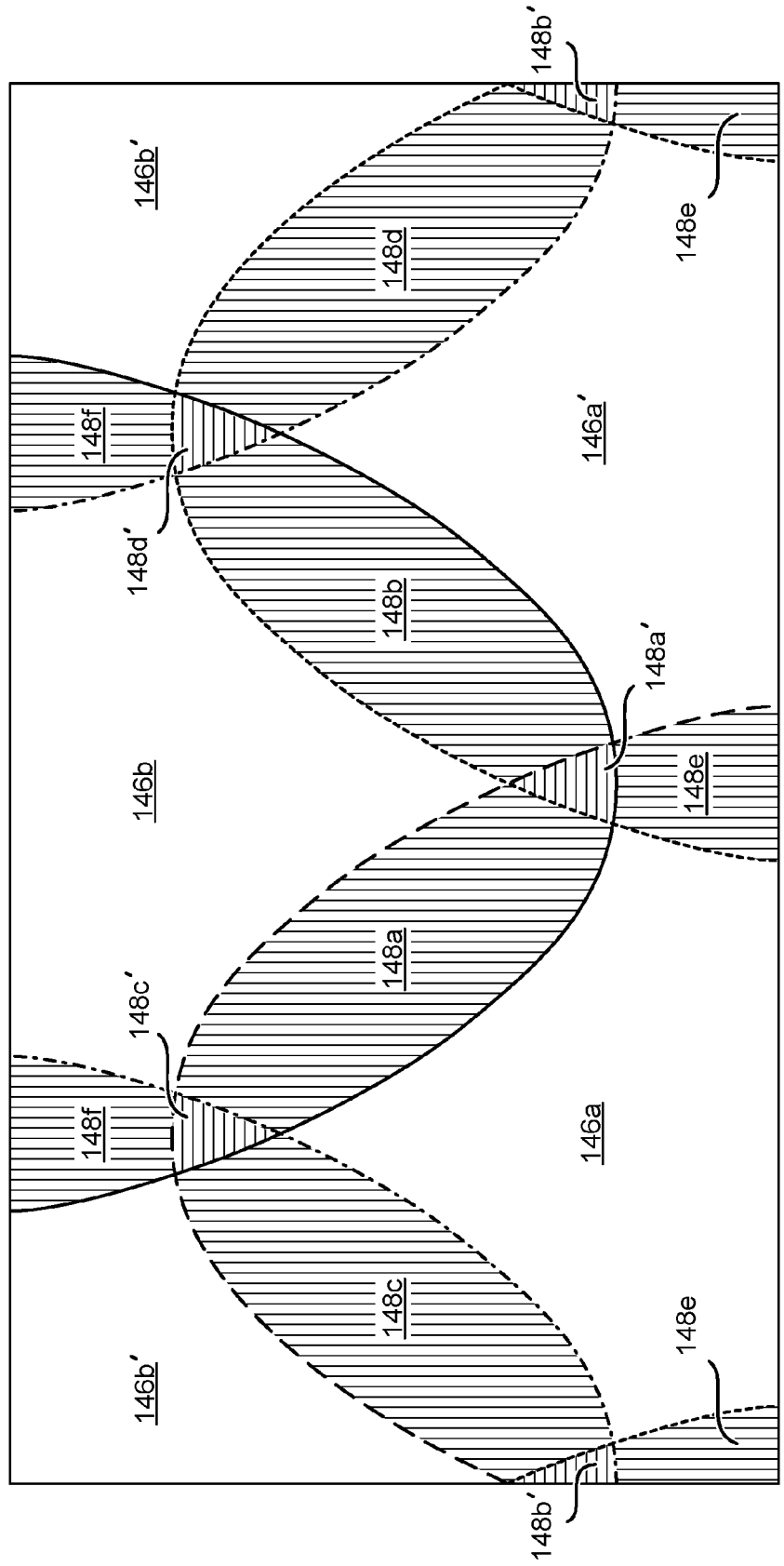
FIG. 3 is a diagram illustrating overlapping areas captured by the example omnidirectional camera embodiment.

Referring to FIG. 3, overlapping areas captured by the example omnidirectional camera 100 are shown. The respective areas 146*a*-146*a*' and 146*b*-146*b*' are shown. The respective areas 146*a*-146*a*' and 146*b*-146*b*' in FIG. 3 are shown in an arrangement similar to how a stitched together video signal would appear for the spherical field of view when projected onto a two-dimensional surface using an equirectangular projection. Various overlapping areas are shown.

The overlapping areas 148*a*-148*d* of the neighboring lenses are shown. The overlapping area 148*a* is shown as part of the coverage of the respective areas 146*a* and 146*b*. The overlapping area 148*b* is shown as part of the coverage of the respective areas 146*b* and 146*a*'. The overlapping area 148*c* is shown as part of the coverage of the respective areas 146*a* and 146*b*'. The overlapping area 148*d* is shown as part of the coverage of the respective areas 146*a*' and 146*b*'.

Some of the overlapping areas correspond to overlapping areas of the opposite lens pairs (e.g., the opposite lens pair 110*a*-110*a*' and the opposite lens pair 110*b*-110*b*'). Overlapping areas 148*e* are shown as part of the coverage of the respective areas 146*a* and 146*a*' corresponding to the opposite lens pair 110*a*-110*a*'. Overlapping areas 148*f* are shown as part of the coverage of the respective areas 146*b* and 146*b*' corresponding to the opposite lens pair 110*b*-110*b*'.

Some of the overlapping areas correspond to overlapping areas between three of the lenses 110*a*-110*a*' and 110*b*-110*b*'. An overlapping area 148*a*' comprises the respective areas 146*a*, 146*a*' and 146*b* (e.g., the overlapping area 148*a*' comprises the overlapping areas 148*a*, 148*b* and 148*e*). An overlapping area 148*a*' comprises the respective areas 146*a*, 146*a*' and 146*b*' (e.g., the overlapping area 148*b*' comprises the overlapping areas 148*c*, 148*d* and 148*e*). An overlapping area 148*c*' comprises the respective areas 146*a*, 146*b* and 146*b*' (e.g., the overlapping area 148*c*' comprises the overlapping areas 148*a*, 148*c* and 148*f*). An overlapping area 148*d*' comprises the respective areas 146*a*', 146*b* and 146*b*' (e.g., the overlapping area 148*d*' comprises the overlapping areas 148*b*, 148*d* and 148*f*).

The respective areas 146*a*-146*a*' and 146*b*-146*b*', the overlapping areas 148*a*-148*f* and the overlapping areas 148*a*'-148*d*' shown in FIG. 3 are a representative example. The various sizes of the respective areas 146*a*-146*a*' and 146*b*-146*b*', the overlapping areas 148*a*-148*f* and the overlapping areas 148*a*'-148*d*' may be varied according to the design criteria of a particular implementation. Generally, the overlapping areas between neighboring lenses (e.g., the overlapping areas 148*a*-148*d*) are larger than the overlapping areas between the lens pairs (e.g., 148*e*-148*f*). Since the overlapping areas between neighboring lenses (e.g., the overlapping areas 148*a*-148*d*) are larger than the overlapping areas between the lens pairs (e.g., 148*e*-148*f*), reducing an amount of the overlapping areas 148*a*-148*d* may have a greater impact on reducing the parallax effects than reducing the amount of the overlapping areas 148*e*-148*f*.

Figure 4:
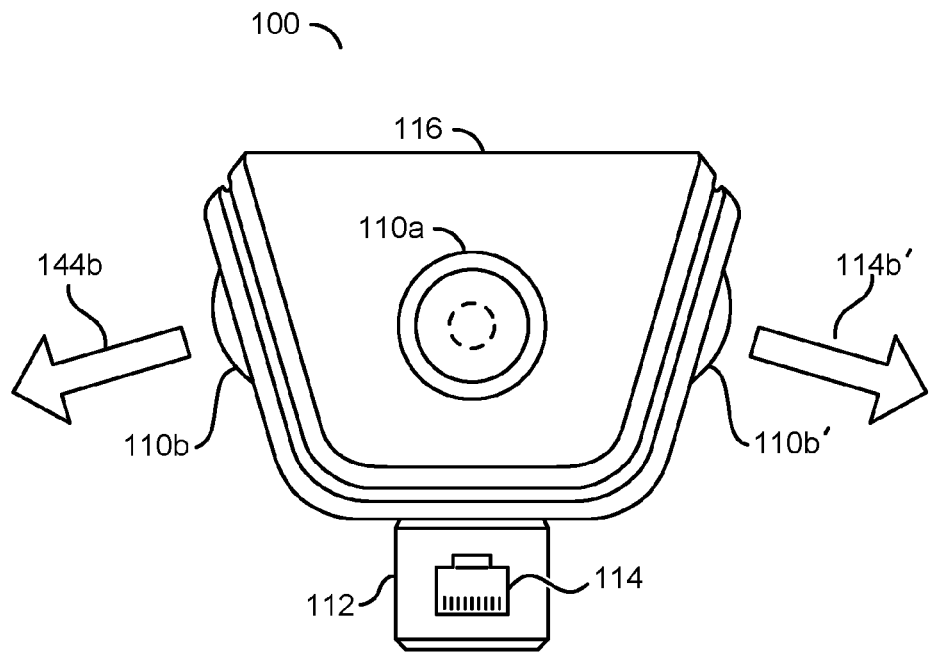
FIG. 4 is a diagram illustrating a side view of the example omnidirectional camera.

Referring to FIG. 4, a first side view of the omnidirectional camera 100 is shown. The direction of the optical axis 144*b* of the lens 110*b* and the direction of the optical axis 144*b*' of the lens 110*b*' are shown at a slightly downward angle. The slightly downward angle of the optical axes 144*b*-144*b*' of the lenses 110*b*-110*b*' may allow the lenses of the omnidirectional camera 100 to provide coverage for the spherical (or omnidirectional) field of view of the scene surrounding the camera 100. In some embodiments, the lenses 110*b*-110*b*' may capture a portion of the scene surrounding the camera 100 in all directions. The slightly downward angle of the optical axes 144*b*-144*b*' may allow the lenses 110*b*-110*b*' to capture the respective areas 146*b*-146*b*' of the spherical field of view on two sides and below the omnidirectional camera 100.

The lenses 110*b* and 110*b*' may be part of one subset of the lenses of the camera 100. In the embodiment shown in FIG. 4, the lenses 110*b* and 110*b*' may be opposite lenses on the camera 100 (e.g., an opposite lens pair). The optical axis 144*b* of the lens 110*b* and the optical axis 144*b*' of the lens 110*b*' may intersect (e.g., at a location in the frame 116). The respective areas 146*b*-146*b*' of the spherical field of view captured by the lenses 110*b* and 110*b*' may have a slight amount of overlap. Since there is a slight overlap of the respective areas 146*b*-146*b*', there may be a small amount of artifacts due to parallax effects between the opposite lenses 110*b* and 110*b*'. Generally, reducing parallax effects caused by the opposite lenses 110*b* and 110*b*' is less important than reducing parallax effects caused by the neighboring lenses (e.g., the lens 110*b* with respect to the lenses 110*a* and 110*a*' and/or the lens 110*b*' with respect to the lenses 110*a* and 110*a*').

Figure 5:
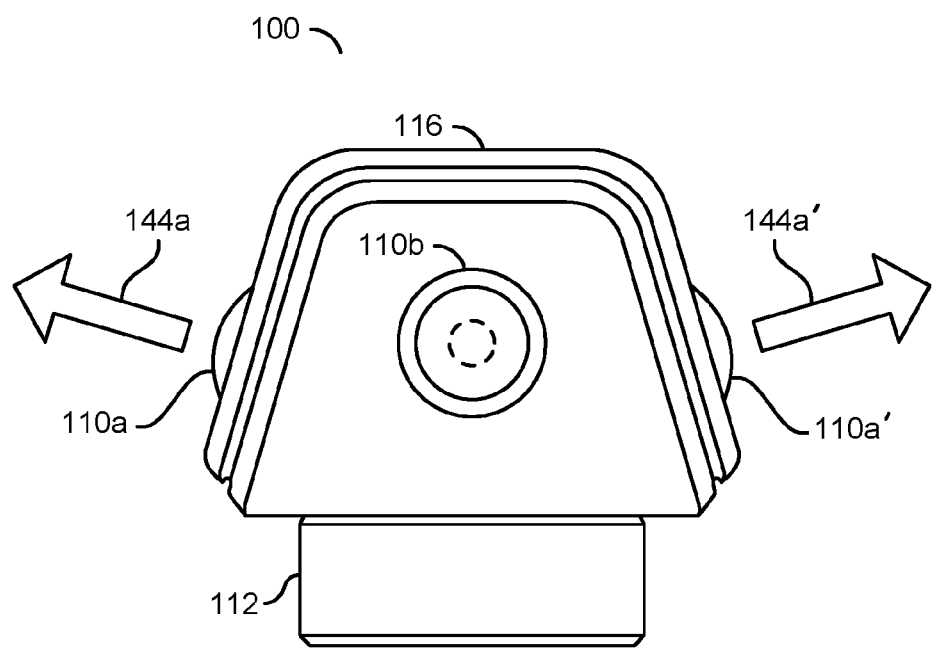
FIG. 5 is a diagram illustrating another side view of the example omnidirectional camera.

Referring to FIG. 5, a second side view of the omnidirectional camera 100 is shown. The direction of the optical axis 144*a* of the lens 110*a* and the direction of the optical axis 144*a*' of the lens 110*a*' are shown at a slightly upward angle. The slightly upward angle of the optical axes 144*a*-144*a*' of the lenses 110*a*-110*a*' may allow the lenses of the omnidirectional camera 100 to provide coverage for the spherical (or omnidirectional) field of view of the scene surrounding the camera 100. In some embodiments, the lenses 110*a*-110*a*' may capture a portion of the scene surrounding the camera 100 in all directions. The slightly upward angle of the optical axes 144*a*-144*a*' may allow the lenses 110*a*-110*a*' to capture the respective areas 146*a*-146*a*' of the spherical field of view on two sides and above the omnidirectional camera 100.

The lenses 110*a* and 110*a*' may be part of one subset of the lenses of the camera 100. In the embodiment shown in FIG. 5, the lenses 110*a* and 110*a*' may be opposite lenses on the camera 100 (e.g., an opposite lens pair). The optical axis 144*a* of the lens 110*a* and the optical axis 144*a*' of the lens 110*a*' may intersect (e.g., at a location in the frame 116). The respective areas 146*a*-146*a*' of the spherical field of view captured by the lenses 110*a* and 110*a*' may have a slight amount of overlap. Since there is a slight overlap of the respective areas 146*a*-146*a*', there may be a small amount of artifacts due to parallax effects between the opposite lenses 110*a* and 110*a*'. Generally, reducing parallax effects caused by the opposite lenses 110*a* and 110*a*' is less important than reducing parallax effects caused by the neighboring lenses (e.g., the lens 110a with respect to the lenses 110b and 110b' and/or the lens 110a' with respect to the lenses 110b and 110b').

A combination of one subset of the lenses (e.g., the lenses 110a-110a') and another subset of the lenses (e.g., the lenses 110b-110b') may provide coverage for a spherical field of view and reduce parallax effects when the spherical field of view is recorded using the lenses 110a-110a' and 110b-110b'. The lenses 110a-110a' may provide coverage for respective areas 146a-146a' above the omnidirectional camera 100 and on two sides of the omnidirectional camera 100. The lenses 110b-110b' may provide coverage for respective areas 146b-146b' below the omnidirectional camera 100 and on the two other sides of the omnidirectional camera 100. By capturing the respective areas 146a-146a' and 146b-146b' from the lenses 110a-110a' and 110b-110b' as video frames, converting the video frames into video files and stitching the video files together, a spherical field of view may be generated.

Figure 6:
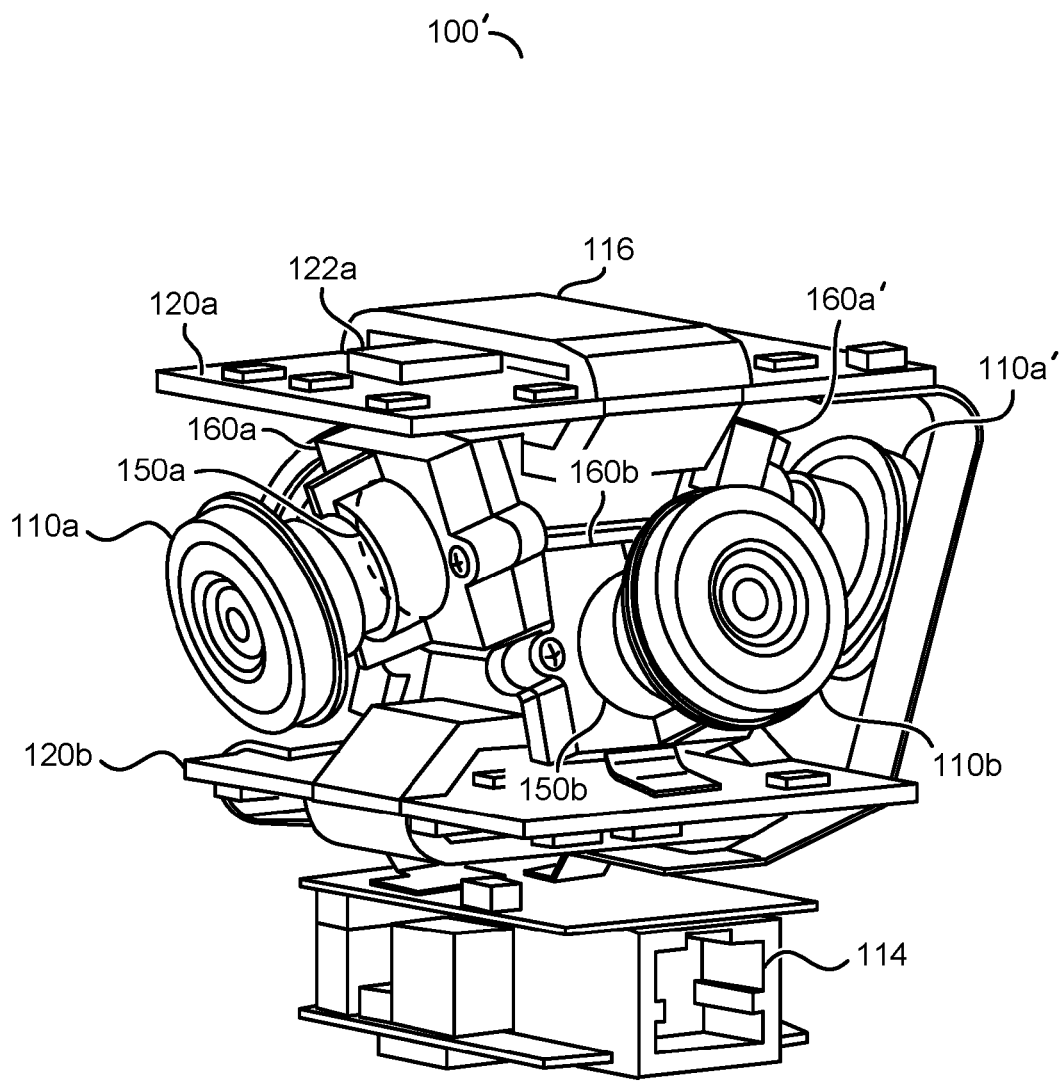
FIG. 6 is a diagram illustrating a perspective view of an example assembly of an omnidirectional camera.

Referring to FIG. 6, a perspective view of an example assembly of the omnidirectional camera 100' is shown. The example assembly of the omnidirectional camera 100' may comprise one subset of lenses (e.g., the opposite lens pair 110a-110a'), another subset of lenses (e.g., the opposite lens pair 110b-110b'), the interface 114, the frame 116 and/or the circuits 120a-120b. The frame 116 is shown as a unibody design assembly.

The circuits 120a-120b may implement components configured to provide power, connections (e.g., traces, data buses, etc.), signals, and/or logic for the operation of the omnidirectional camera 100'. In an example, one circuit may be configured to operate with one of the opposite lens pairs (e.g., the circuit 120a may operate with the subset of lenses comprising the lens 110a and the lens 110a', and the circuit 120b may operate with the subset of lenses comprising the lens 110b and the lens 110b'). In another example, the circuits 120a-120b may operate with each of the lenses 110a-110a' and 110b-110b'. The implementation of the circuits 120a-120b may be varied according to the design criteria of a particular implementation.

The circuit 120a is shown comprising a block (or circuit) 122a. The circuit 122a may be a video processor. Similarly, the circuit 120b may comprise a video processor 122b. Other components may be implemented on the circuits 120a-120b (e.g., a communication block, an audio codec block, a memory, etc.).

The lens 110a is shown having a sensor 150a. The lens 110b is shown having a sensor 150b. Similarly the other lenses may have respective sensors (e.g., the lens 110a' may have an associated sensor 150a' and the lens 110b' may have an associated sensor 150b'). Each of the lenses 110a-110a' and 110b-110b' may have a respective base 160a-160a' and 160b-160b'. The bases 160a-160a' and 160b-160b' may contain the respective sensors 150a-150a' and 150b-150b' and/or other logic. For example, the base 160a, the sensor 150a and the lens 110a may be a capture device. Similarly, the base 160a', the sensor 150a' and the lens 110a' may be a capture device, the base 160b, the sensor 150b and the lens 110b may be a capture device and the base 160b', the sensor 150b' and the lens 110b' may be a capture device.

Implementation of the sensor 150a may be representative of the implementation of the sensors 150a, 150a', 150b and/or 150b'. The sensor 150a may receive light from the lens 110a (e.g., the lens 110a may focus light on the sensor 150a). The sensor 150a may be configured to convert light to pixel data (e.g., image data). For example, the sensor 150a may be implemented as an array (e.g., a photosensor with a color filter array) configured to detect an intensity and/or color of incoming light.

The pixel data (e.g., raw image data) from the sensor 150a may be used to generate video frames. The video frames may be a number of images generated by the sensor 150a in response to the light captured by the lens 110a over time. The video frames may be in an uncompressed (e.g., raw) format. The uncompressed format may be a Bayer format, a red/clear/clear/clear (RCCC) format, a red/green/blue/clear (RGBC) format, RGB format, YUV format, etc. The sensor 150a may provide video frames to the circuit 120a for processing by the video processor 122a.

The processors 122a-122b may be configured to process and/or encode the uncompressed video frames captured by the sensors 150a-150a' and 150b-150b' to create video streams that are encoded versions of the video frames. Each of the processors 122a-122b may be configured to present one of the video streams to a communication block of the circuits 120a-120b for output via the interface 114. For example, the interface 114 may receive power for the omnidirectional camera 100' from an external source and/or transmit video streams generated by the omnidirectional camera 100' to an external source.

The bases 160a-160a' and 160b-160b' may provide structural support for the respective lenses 110a-110a' and 110b-110b' (e.g., provide an attachment to the frame 116). The base 160a is shown tilted slightly downward. The base 160b is shown tilted slightly upward. In an example, the bases 160a-160a' and 160b-160b' may be configured to aim a direction of the optical axes 144a-144a' and 144b-144b'. In some embodiments, the bases 160a-160a' and 160b-160b' may be in a fixed direction (e.g., not moveable). In some embodiments, the bases 160a-160a' and 160b-160b' may be moveable (e.g., tilted, rotated, etc.). In some embodiments, the direction of the tilt of the bases 160a-160a' and 160b-160b' may be in the same direction for opposite lens pairs (e.g., the subset of lenses 110a-110a' are both tilted in the same downward direction and the subset of lenses 110b-110b' are both tilted in the same upward direction). The implementation of the bases 160a-160a' and 160b-160b' may be varied according to the design criteria of a particular implementation.

Figure 7:
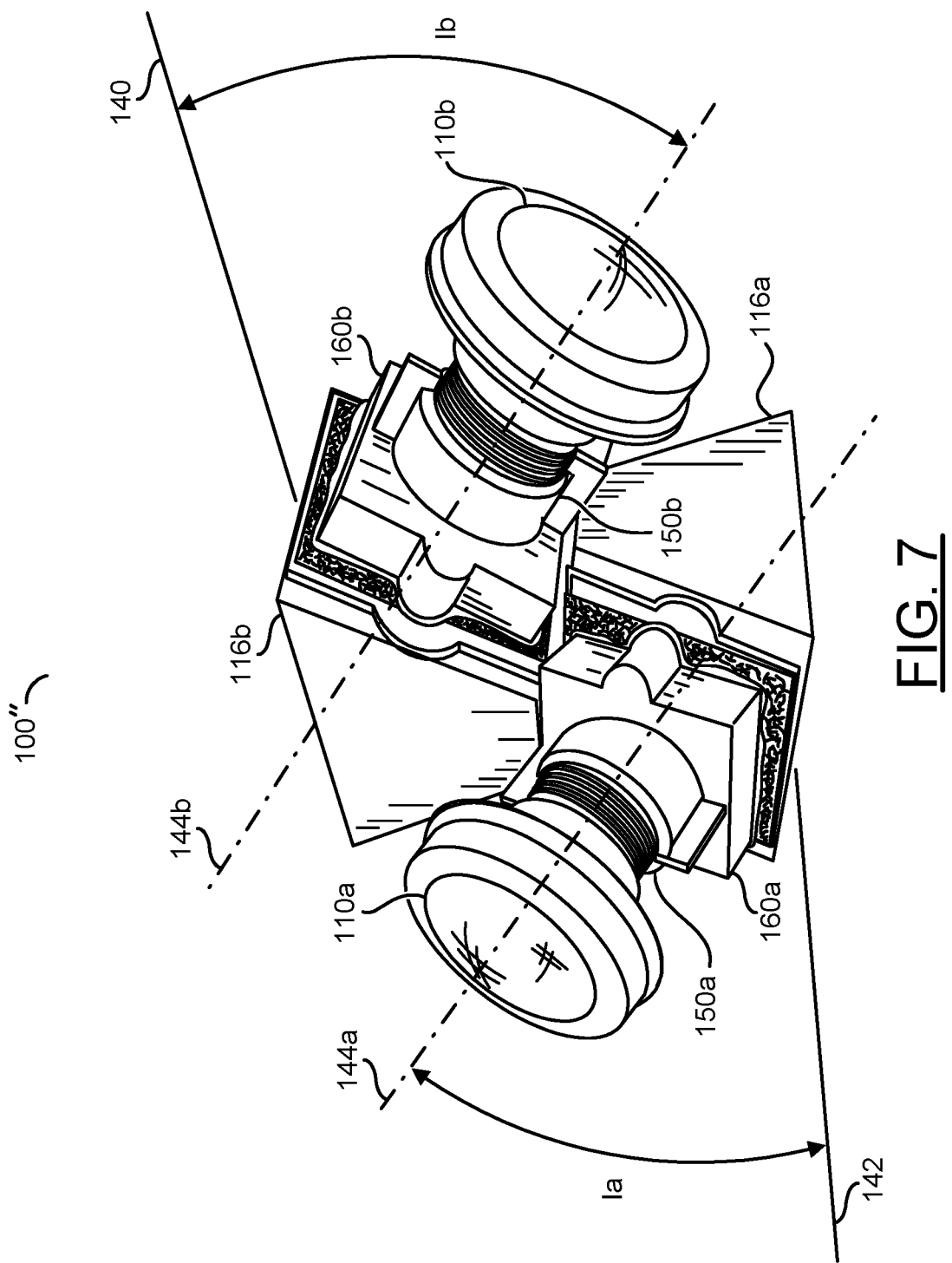
FIG. 7 is a diagram illustrating angles of inclination and optical axes of lenses of an omnidirectional camera.

Referring to FIG. 7, angles of inclination and optical axes of lenses of the omnidirectional camera 100" are shown. The omnidirectional camera 100" is shown having a dual-frame assembly. A frame 116a comprises one subset of the lenses 110a-110a' (e.g., one opposite pair of lenses) and a frame 116b comprises another subset of the lenses 110b-110b'. The frame 116a is shown having a design allowing the subset of the lenses 110a-110a' to be tilted upwards. The frame 116b is shown having a design allowing the subset of the lenses 110b-110b' to be tilted downwards. The configuration of the frames 116a and 116b may be varied according to the design criteria of a particular implementation.

The base 160a is shown attached to the frame 116a. The base 160a is shown directing the lens 110a along the axis 142. The optical axis 144a is shown extending through a center of the lens 110a. One component of the optical axis 144a may extend in the direction of the axis 142. The lens 110a and the base 160a are shown tilted upward. An angle of inclination (e.g., Ia) is shown between the axis 142 and the optical axis 144a of the lens 110a. The angle of inclination Ia may be an amount that the lens 110a is tilted.

The base 160b is shown attached to the frame 116b. The base 160b is shown directing the lens 110b along the axis 140. The optical axis 144b is shown extending through a center of the lens 110*b*. One component of the optical axis 144*b* may extend in the direction of the axis 140. The lens 110*b* and the base 160*b* are shown tilted downward. An angle of inclination (e.g., Ib) is shown between the axis 140 and the optical axis 144*b* of the lens 110*b*. The angle of inclination Ib may be an amount that the lens 110*b* is tilted.

To reduce parallax effects when the spherical field of view is recorded, the optical axes of the neighboring lenses (e.g., the optical axes 144*a* and 144*b* of the neighboring lenses 110*a* and 110*b* shown in FIG. 7) may be configured to not intersect. For example, the optical axes 144*a* and 144*b* are not coplanar. The optical axes 144*a* and 144*b* of the neighboring lenses 110*a* and 110*b* are shown not intersecting. The optical axes 144*a* and 144*b* are not intersecting because the optical axis 144*a* extends in a direction along the axis 142 and the optical axis 144*b* extends in a direction along the axis 140), the bases 160*a* and 160*b* are tilted to direct the optical axes 144*a* and 144*b* in vertically opposite directions and/or because the bases 160*a* and 160*b* are displaced in reference to each other.

Various orientations and/or arrangements may be implemented to ensure the optical axes of the neighboring lenses do not intersect. In an example, the subsets of the lenses 110*a*-110*a'* and 110*b*-110*b'* are shown positioned orthogonally in reference to each other. In another example, the subsets of the lenses 110*a*-110*a'* and 110*b*-110*b'* are shown displaced in reference to each other (e.g., the frame 116*b* is shown above the frame 116*a*. In yet another example, the subsets of the lenses 110*a*-110*a'* and 110*b*-110*b'* are tilted in vertically opposite directions (e.g., the opposite pair of lenses 110*a*-110*a'* are both tilted upward and the opposite pair of lenses 110*b*-110*b'* are both tilted downward). A combination of the orientations and/or arrangements used for ensuring the optical axes of the neighboring lenses do not intersect may be varied according to the design criteria of a particular implementation.

Referring to FIGS. 8-16, example arrangements and/or orientations of the capture devices of the omnidirectional camera 100 are shown. The example arrangements may show a stylized camera model representing a simplified version of the omnidirectional camera 100 for illustrative purposes. The stylized camera model may comprise the lenses 110*a*-110*a'* and 110*b*-110*b'*, the sensors 150*a*-150*a'* and 150*b*-150*b'* and the camera sensor support bases 160*a*-160*a'* and 160*b*-160*b'*. Centers of projection of each of the lenses 110*a*-110*a'* and 110*b*-110*b'* are also shown. The lens 110*a* may have a center of projection 202*a*. The lens 110*a'* may have a center of projection 202*a'*. The lens 110*b* may have a center of projection 202*b*. The lens 110*b'* may have a center of projection 202*b'*.

The center of projection may be a center point (e.g., a focal point) between a lens and a respective sensor. In an example, the center of projection 202*a'* may be at a center point between a center of the lens 110*a'* and the center of the sensor 150*a'*, the center of projection 202*b* may be at a center point between a center of the lens 110*b* and the center of the sensor 150*b* and the center of projection 202*b'* may be at a center point between a center of the lens 110*b'* and the center of the sensor 150*b'*. Similarly, the center of projection 202*a* may be a center point between a center of the lens 110*a* and the center of the sensor 150*a*. For example, the centers of projection 202*a*-202*a'* and 202*b*-202*b'* may be located at a central point in a respective lens barrel. The centers of projection 202*a*-202*a'* and 202*b*-202*b'* may change as the length of the lens barrel changes (e.g., the lenses 110*a*-110*a'* and 110*b*-110*b'* extend and/or retract to zoom in/out). The centers of projection 202*a*-202*a'* and 202*b*-202*b'* may change based on the optical characteristics of the lenses 110*a*-110*a'* and 110*b*-110*b'*. In an example, the centers of projection 202*a*-202*a'* and 202*b*-202*b'* may not be exactly halfway between the lenses 110*a*-110*a'* and 110*b*-110*b'* and the sensors 150*a*-150*a'* and 150*b*-150*b'*.

A distance (e.g., H) may be a measurement between the center of projection and the back of the base (e.g., including the thickness of the base). A distance (e.g., B) may be a measurement of a width of the base. A thickness (e.g., T) may be a measurement of the thickness of the bases 160*a*-160*a'* and 160*b*-160*b'*. The distances H, B and T may be equal for each of the lenses 110*a*-110*a'* and 110*b*-110*b'*.

Figure 8:
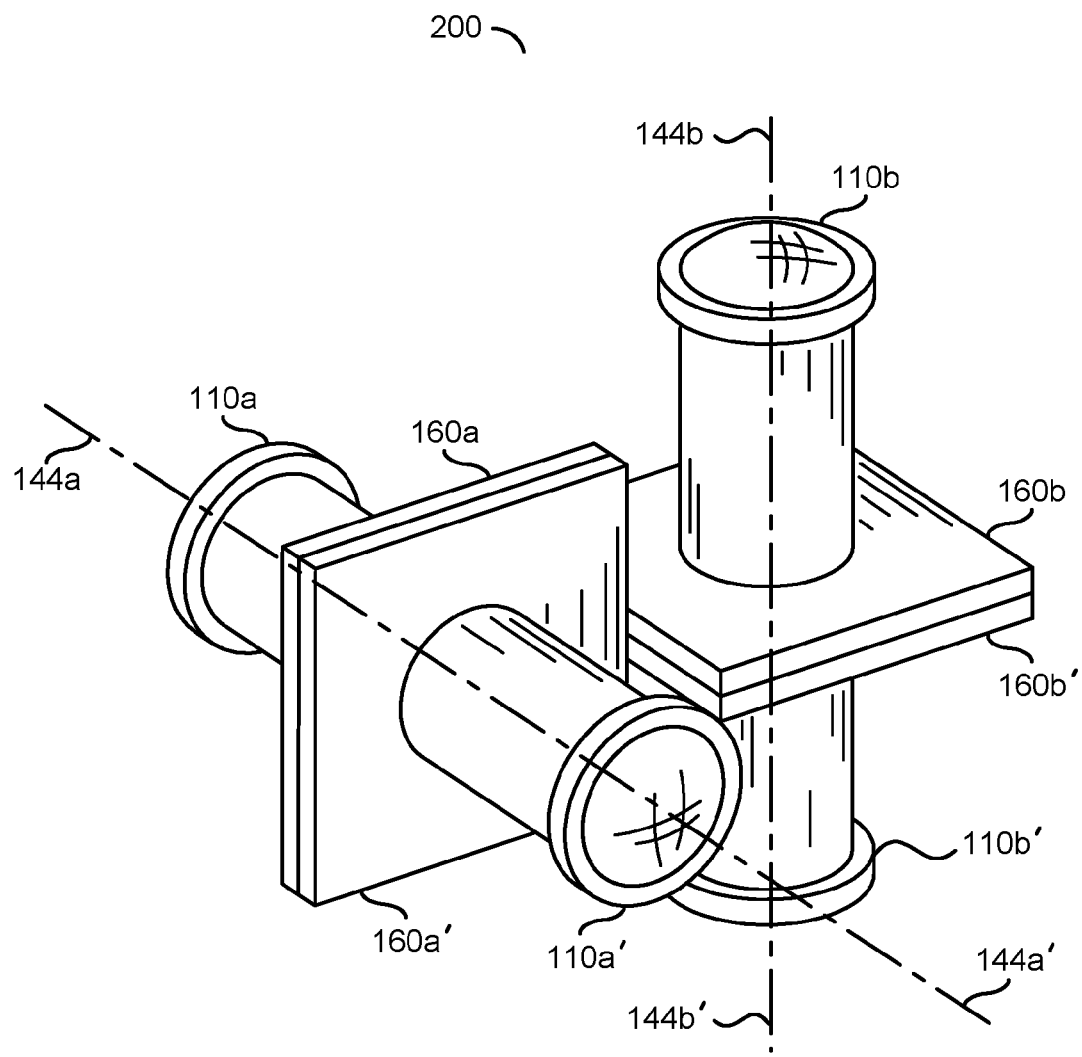
FIG. 8 is a diagram illustrating an example arrangement of lenses for reducing parallax effects.

Referring to FIG. 8, an example arrangement of lenses 110*a*-110*a'* and 110*b*-110*b'* for reducing parallax effects 200 is shown. The example arrangement of lenses 110*a*-110*a'* and 110*b*-110*b'* for reducing parallax effects 200 may implement an orientation/arrangement where the neighboring lenses are displaced and orthogonal in reference to each other. One subset of the lenses (e.g., the opposite pair 110*a*-110*a'*) is shown placed adjacent to the other subset of the lenses (e.g., the opposite pair 110*b*-110*b'*). For example, the opposite pairs 110*a*-110*a'* and 110*n*-110*b'* may be orthogonally on top of (or adjacent to) each other.

The bases 160*a*-160*a'* of the lenses 110*a*-110*a'* are shown back-to-back. The back-to-back arrangement of the bases 160*a*-160*a'* allows the optical axes 144*a*-144*a'* of the lenses 110*a*-110*a'* to extend in opposite directions. The bases 160*b*-160*b'* of the lenses 110*b*-110*b'* are shown back-to-back and orthogonal to the bases 160*a*-160*a'*. The back-to-back arrangement of the bases 160*b*-160*b'* allows the optical axes 144*b*-144*b'* of the lenses 110*b*-110*b'* to extend in opposite directions. The orthogonal arrangement of the bases 160*a*-160*a'* and 160*b*-160*b'* with respect to each other may allow the lenses 110*a*-110*a'* and 110*b*-110*b'* to capture respective areas 146*a*-146*a'* and 146*b*-146*b'* that provide coverage for the spherical field of view.

By displacing the subset of lenses 110*a*-110*a'* and the subset of lenses 110*b*-110*b'* with respect to each other and arranging the subset of lenses 110*a*-110*a'* and the subset of lenses 110*b*-110*b'* to be orthogonal with respect to each other may reduce parallax effects and allow full coverage for the spherical field of view. In general, the optical axes 144*a*-144*a'* do not intersect with the optical axes 144*b*-144*b'*.

Figure 9:
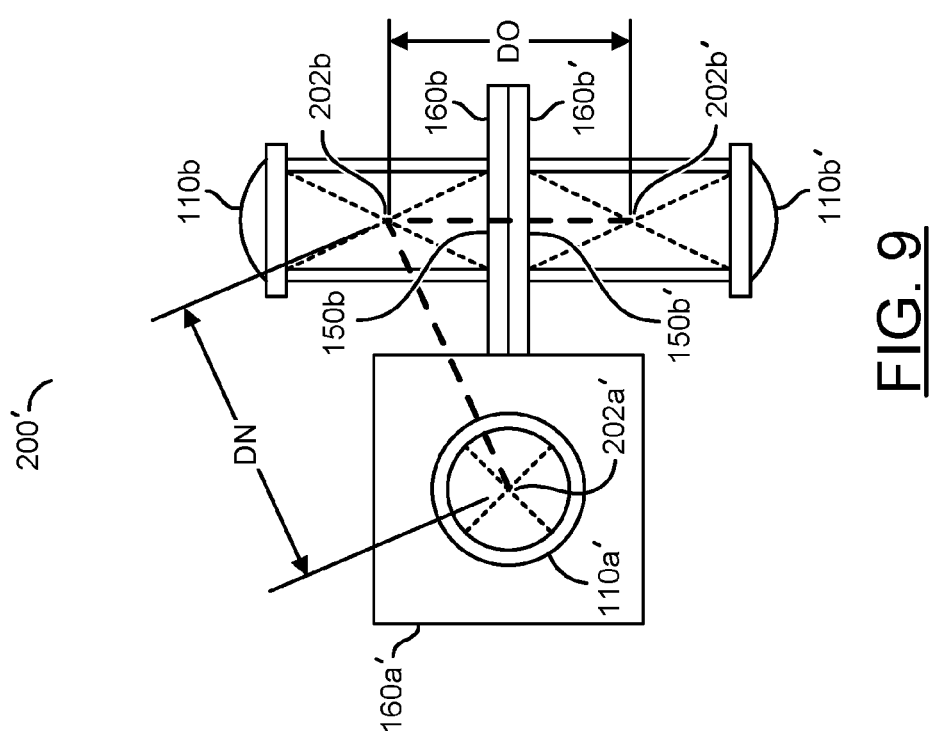
FIG. 9 is a diagram illustrating a side view of the arrangement of the lenses.

Referring to FIG. 9, a side view of the arrangement of the lenses 200' is shown. The center of projection is shown for each of the lenses 110*a'*, 110*b* and 110*b'* in the side view 200'. The lens 110*a'* may have the center of projection 202*a'*. The lens 110*b* may have the center of projection 202*b*. The lens 110*b'* may have the center of projection 202*b'*. Similarly, the lens 110*a* may have the center of projection 202*a* (e.g., not shown in the side view 200').

A distance (e.g., DO) between the centers of projection 202*b*-202*b'* of the opposite pair of lenses 110*b*-110*b'* is shown. A distance (e.g., DN) between the center of projection 202*a'* of the lens 110*a'* in one subset of the lenses 110*a*-110*a'* and the center of projection 202*b* of the lens 110*b* in another subset of the lenses 110*b*-110*b'* is shown (e.g., one example of a distance between the centers of projection of neighboring lenses). The distance DO may be the same for the distance between the centers of projection 202*a*-202*a'* of the opposite pair of lenses 110*a*-110*b'*. The distance DN may be the same for the various combinations of neighboring lenses (e.g., a distance between the centers of projection 202*a* and 202*b*, a distance between the centers of projection 202*a* and 202*b'* and a distance between the centers of projection 202*a'* and 202*b'*).

Figure 10:
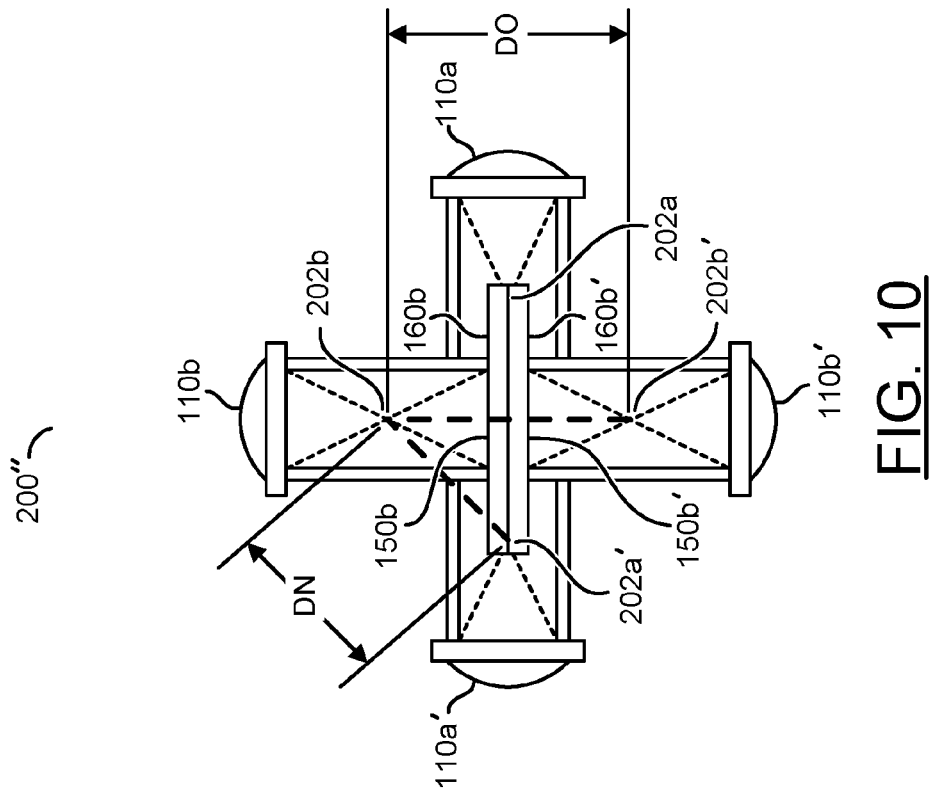
FIG. 10 is a diagram illustrating an alternate side view of the arrangement of the lenses.

Referring to FIG. 10, an alternate side view 200'' of the arrangement of the lenses is shown. The distance DN is shown between the center of projection 202b of the lens 110b and the center of projection 202a' of the lens 110a'.

Parallax effects may be reduced by positioning the centers of projection of the lenses 110a-110a' and 110b-110b' (e.g., the centers of projection 202a, 202a', 202b and/or 202b') close to a common location (e.g., reduce a distance between the centers of projection 202a, 202a', 202b and/or 202b'). Reducing the distances DN and DO may bring the centers of projection 202a, 202a', 202b and/or 202b' closer to the common location. Generally, reducing the distance DN may be more effective for reducing parallax effects than reducing the distance DO.

In the example arrangement of lenses 110a-110a' and 110b-110b' for reducing parallax effects 200, an equation representing the distance DN may be:

$$DN=\sqrt{2H^2+B^2} \quad (1)$$

In the example arrangement of lenses 110a-110a' and 110b-110b' for reducing parallax effects 200, an equation representing the distance DO may be:

$$DO=2H \quad (2)$$

Depending on the actual size of the lenses 110a-110a' and 110b-110b' and the bases 160a-160a' and 160b-160b', the example arrangement of lenses for reducing parallax effects 200 may be advantageous. In an example, where H=600 mm and B=1355 mm, DN may be 1599 mm and DO may be 1200 mm. Similar measurements may be determined based on various dimensions of the design criteria of a particular implementation.

Figure 11:
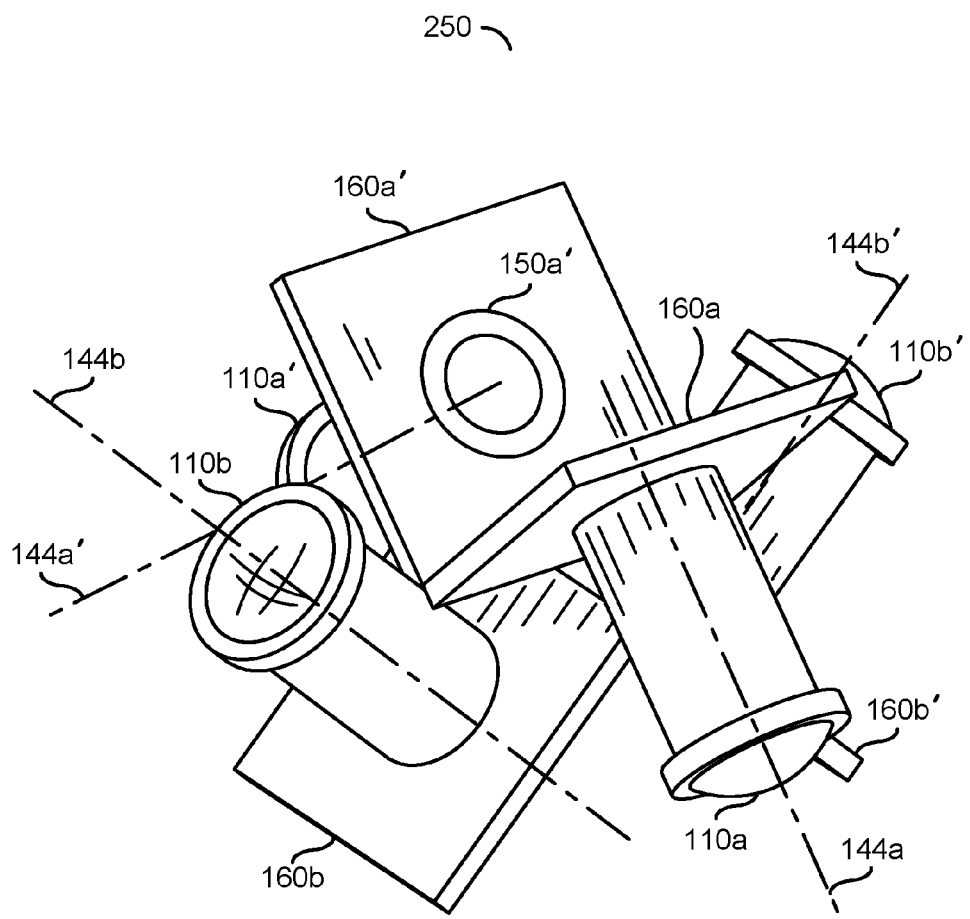
FIG. 11 is a diagram illustrating an example inclined arrangement of lenses for reducing parallax effects.

Referring to FIG. 11, an example inclined arrangement of lenses for reducing parallax effects 250 is shown. The example inclined arrangement of lenses for reducing parallax effects 250 may implement an orientation/arrangement where the neighboring lenses are displaced and orthogonal in reference to each other and the neighboring lenses are tilted in vertically opposite directions with respect to each other. One subset of the lenses (e.g., the opposite pair 110a-110a') is shown placed adjacent to the other subset of the lenses (e.g., the opposite pair 110b-110b'). One subset of the lenses (e.g., the opposite pair 110a-110a') is shown tilted downward. Another subset of the lenses (e.g., the opposite pair 110b-110b') is shown tilted upward.

The example inclined arrangement of lenses for reducing parallax effects 250 may bring the directly neighboring camera focal points (e.g., the centers of projection for the neighboring lenses) closer to each other. Although the distance between the focal points of opposite cameras (e.g., the centers of projection of the opposite pairs) is increased, the distance between the centers of projection of directly neighboring cameras continues to decrease with the inclination.

The bases 160a-160a' of the lenses 110a-110a' are shown back-to-back along one edge (e.g., the bottom edge of the bases 160a-160a') and tilted away from each other along the opposite edge (e.g., the top edge of the bases 160b-160b'). The back-to-back and tilted arrangement of the bases 160a-160a' allows the optical axes 144a-144a' of the lenses 110a-110a' to extend in opposite directions and provide coverage for areas 146a-146a' of the spherical field of view below the omnidirectional camera 100. The bases 160b-160b' of the lenses 110b-110b' are shown back-to-back along one edge (e.g., the top edge of the bases 160b-160b') and tilted away from each other along the opposite edge (e.g., the bottom edge of the bases 160b-160b'). The back-to-back and tilted arrangement of the bases 160b-160b' allow the optical axes 144b-144b' of the lenses 110b-110b' to extend in opposite directions and provide coverage for areas 146b-146b' of the spherical field of view above the omnidirectional camera 100. The orthogonal arrangement of the bases 160a-160a' and 160b-160b' with respect to each other may allow the lenses 110a-110a' and 110b-110b' to capture respective areas 146a-146a' and 146b-146b' that provide coverage for the spherical field of view.

By displacing the subset of lenses 110a-110a' and the subset of lenses 110b-110b' with respect to each other and arranging the subset of lenses 110a-110a' and the subset of lenses 110b-110b' to be orthogonal with respect to each other (e.g., when projected on a horizontal plane) may reduce parallax effects and allow coverage for the spherical field of view. By tilting the subset of lenses 110a-110a' and the subset of lenses 110b-110b' in vertically opposite directions, the parallax effects may be further reduced. In general, the optical axes 144a-144a' do not intersect with the optical axes 144b-144b'.

Figure 12:
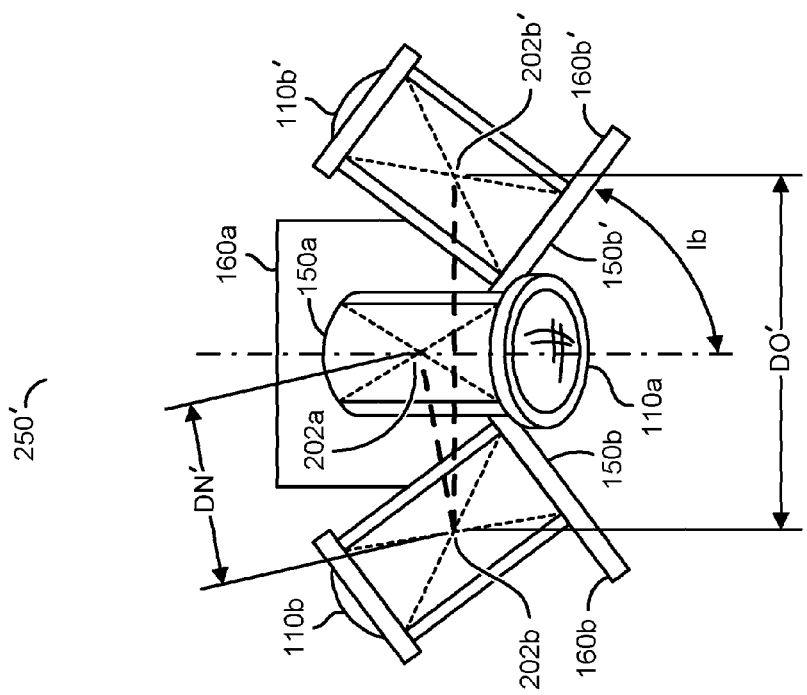
FIG. 12 is a diagram illustrating a side view of the example inclined arrangement of lenses.

Referring to FIG. 12, a side view of the example inclined arrangement of lenses 250' is shown. A center of projection (e.g., 202a, 202b and 202b') is shown for each of the lenses 110a, 110b and 110b' in the side view 250'. Similarly, the lens 110a' may have the center of projection 202a' (e.g., not shown in the side view 250').

The distance DO' between the centers of projection 202b-202b' of the opposite pair of lenses 110b-110b' is shown. The distance DN' between the center of projection 202a of the lens 110a in one subset of the lenses 110a-110a' and the center of projection 202b of the lens 110b in another subset of the lenses 110b-110b' is shown (e.g., one example of a distance between the centers of projection of neighboring lenses). The distance DO' may be the same for the distance between the centers of projection 202a-202a' of the opposite pair of lenses 110a-110a'. The distance DN' may be the same for the various combinations of neighboring lenses (e.g., a distance between the centers of projection 202a' and 202b, a distance between the centers of projection 202a' and 202b' and a distance between the centers of projection 202a and 202b').

The angle of inclination Ib is shown. The angle Ib may represent an amount of upward incline for the opposite pair of lenses 110b-110b'. Similarly, there may be the angle of inclination Ia representing the amount of downward incline for the opposite pair of lenses 110a-110a'. The distance DN' is shown slightly above the distance DO' (e.g., the centers of projection 202a, 202a', 202b and 202b' are not all on the same horizontal plane).

Figure 13:
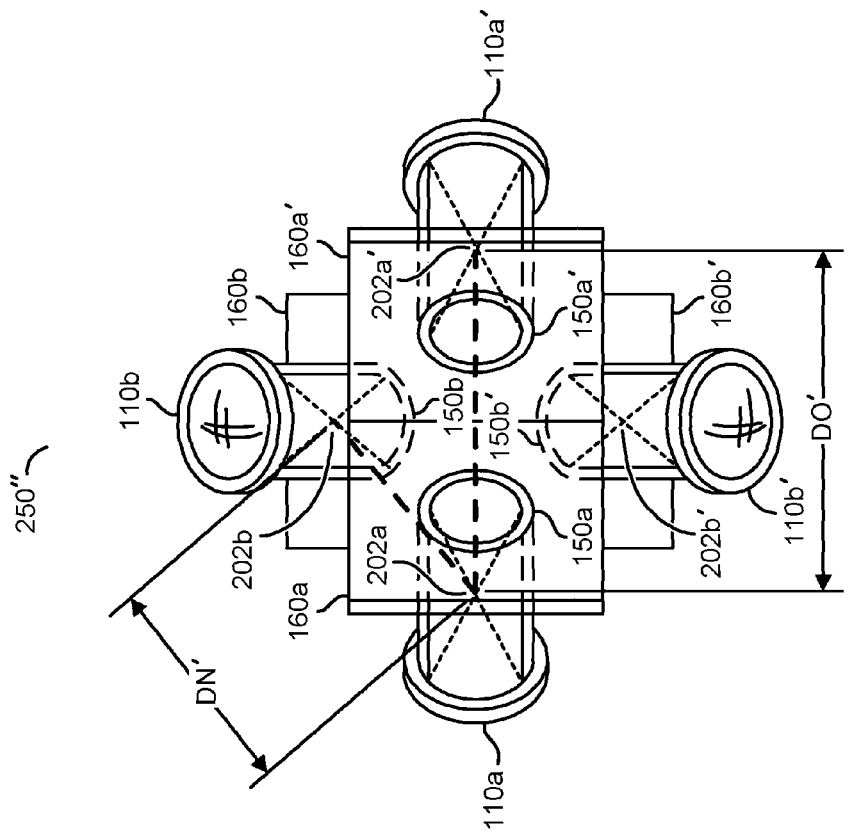
FIG. 13 is a diagram illustrating a top view of the example inclined arrangement of lenses.

Referring to FIG. 13, a top view of the example inclined arrangement of lenses 250'' is shown. The distance DN' is shown between the center of projection 202b of the lens 110b and the center of projection 202a of the lens 110a. The distance DO' is shown between the center of projection 202a of the lens 110a and the center of projection 202a' of the lens 110a'. The optical axes of the neighboring lenses may be orthogonal when projected onto a horizontal plane.

Tilting the lenses 110a, 110a', 110b and/or 110b' (e.g., adjusting the angle of inclination Ia and/or Ib) may reduce the distances between the centers of projection 202a, 202a', 202b and/or 202b'. For an example, the distance DN' in the arrangement 250 may be smaller than the distance DN in the arrangement 200. In an example, the distance DO' in the arrangement 250 may be larger than the distance DO in the arrangement 200. However, to reduce parallax effects, reducing the distance between neighboring lenses (e.g., the distance DN and/or DN') may have a greater importance than reducing the distance between the opposite lens pairs (e.g., the distance DO and/or DO').

In the example inclined arrangement of lenses for reducing parallax effects 250, the angle of inclination may be I (e.g., the angle Ib shown in FIG. 12). In the example inclined arrangement of lenses for reducing parallax effects 250, an equation representing the distance DN' may be:

$$DN' = \sqrt{2\left(\frac{B}{2}\sin(I) + H\cos(I)\right)^2 + 4\left(-\frac{B}{2}\cos(I) + (H-T)\sin(a)\right)^2} \quad (3)$$

In the example inclined arrangement of lenses for reducing parallax effects 250, an equation representing the distance DO' may be:

$$DO' = B \sin(I) + 2H \cos(I) \quad (4)$$

Equations (3) and (4) provide calculations where the bases 160a-160a' and 160b-160b' of opposite pairs are in contact with each other, and that both subsets of the lenses 110a-110a' and 110b-110b' are in contact with each other. For example, in FIG. 12, the top side of the base 160b may be in contact with the top side of the base 160b'. Depending on the actual size of the lenses 110a-110a' and 110b-110b' and the bases 160a-160a' and 160b-160b', the example inclined arrangement of lenses for reducing parallax effects 250 may be advantageous for reducing the parallax effects between the neighboring lenses. In an example, where H=600 mm, B=1355 mm and T=100 mm, DN' may be 1304 mm and DO' may be 1807 mm. Other measurements may be determined based on various dimensions of the design criteria of a particular implementation.

Figure 14:
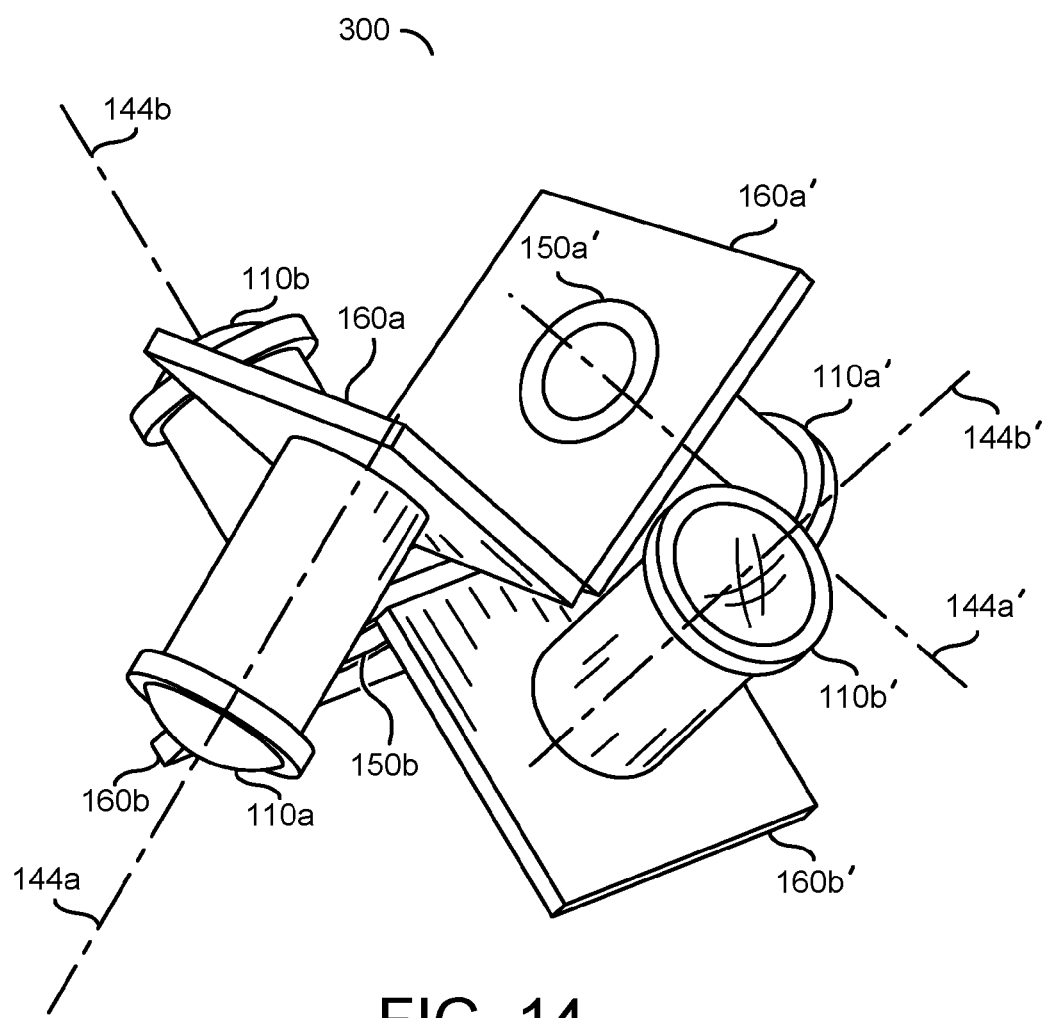
FIG. 14 is a diagram illustrating an example aligned incline arrangement of lenses for reducing parallax effects.

Referring to FIG. 14, an example aligned incline arrangement of lenses for reducing parallax effects 300 is shown. The example aligned inclined arrangement of lenses for reducing parallax effects 300 may implement an orientation/arrangement where the neighboring lenses are displaced and orthogonal in reference to each other and the neighboring lenses are tilted in vertically opposite directions with respect to each other and the centers of projection of the lenses are aligned in a horizontal plane. One subset of the lenses (e.g., the opposite pair 110a-110a') is shown placed adjacent to the other subset of the lenses (e.g., the opposite pair 110b-110b'). One subset of the lenses (e.g., the opposite pair 110a-110a') is shown tilted downward. Another subset of the lenses (e.g., the opposite pair 110b-110b') is shown tilted upward.

The bases 160a-160a' of the lenses 110a-110a' are shown back-to-back along one edge (e.g., the bottom edge of the bases 160a-160a') and tilted away from each other along the opposite edge (e.g., the top edge of the bases 160b-160b'). The back-to-back and tilted arrangement of the bases 160a-160a' allow the optical axes 144a-144a' of the lenses 110a-110a' to extend in opposite directions and provide coverage for areas 146a-146a' of the spherical field of view below the omnidirectional camera 100. The bases 160b-160b' of the lenses 110b-110b' are shown back-to-back along one edge (e.g., the top edge of the bases 160b-160b') and tilted away from each other along the opposite edge (e.g., the bottom edge of the bases 160b-160b'). The back-to-back and tilted arrangement of the bases 160b-160b' allows the optical axes 144b-144b' of the lenses 110b-110b' to extend in opposite directions and provide coverage for areas 146b-146b' of the spherical field of view below the omnidirectional camera 100. The orthogonal arrangement of the bases 160a-160a' and 160b-160b' with respect to each other may allow the lenses 110a-110a' and 110b-110b' to capture respective areas 146a-146a' and 146b-146b' that provide coverage for the spherical field of view.

By displacing the subset of lenses 110a-110a' and the subset of lenses 110b-110b' with respect to each other and arranging the subset of lenses 110a-110a' and the subset of lenses 110b-110b' to be orthogonal with respect to each other may reduce parallax effects and allow coverage for the spherical field of view. By tilting the subset of lenses 110a-110a' and the subset of lenses 110b-110b' in vertically opposite directions, the parallax effects may be further reduced. Tilting the subset of lenses 110a-110a' and the subset of lenses 110b-110b' such that the centers of projection of the lenses are in a common horizontal plane may further reduce the parallax effects. In general, the optical axes 144a-144a' do not intersect with the optical axes 144b-144b'.

Figure 15:
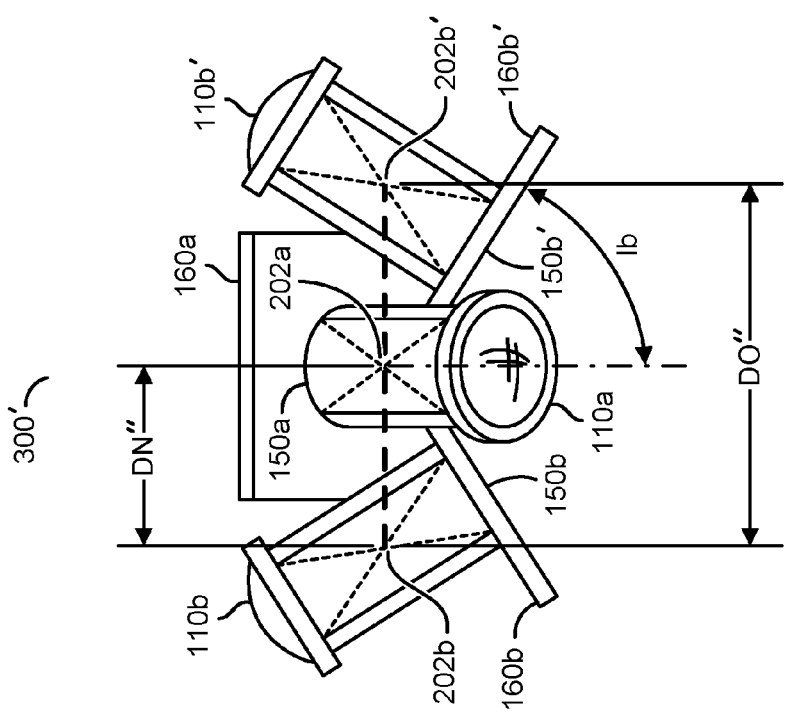
FIG. 15 is a diagram illustrating a side view of the example aligned incline arrangement of lenses.

Referring to FIG. 15, a side view of the example aligned incline arrangement of lenses 300' is shown. The centers of projection (e.g., 202a, 202b and 202b') are shown for each of the lenses 110a, 110b and 110b' in the side view 300'. Similarly, the lens 110a' may have the center of projection 202a' (e.g., not shown in the side view 250').

The distance DO" between the centers of projection 202b-202b' of the opposite pair of lenses 110b-110b' is shown. The distance DN" between the center of projection 202a of the lens 110a in one subset of the lenses 110a-110a' and the center of projection 202b of the lens 110b in another subset of the lenses 110b-110b' is shown (e.g., one example of a distance between the centers of projection of neighboring lenses). The distance DO" may be the same for the distance between the centers of projection 202a-202a' of the opposite pair of lenses 110a-110a'. The distance DN" may be the same for the various combinations of neighboring lenses (e.g., a distance between the centers of projection 202a' and 202b, a distance between the centers of projection 202a' and 202b' and a distance between the centers of projection 202a and 202b'). The distance DN" is shown in line with the distance DO". For example, the centers of projection 202a, 202a', 202b and 202b' are all on the same horizontal plane.

Figure 16:
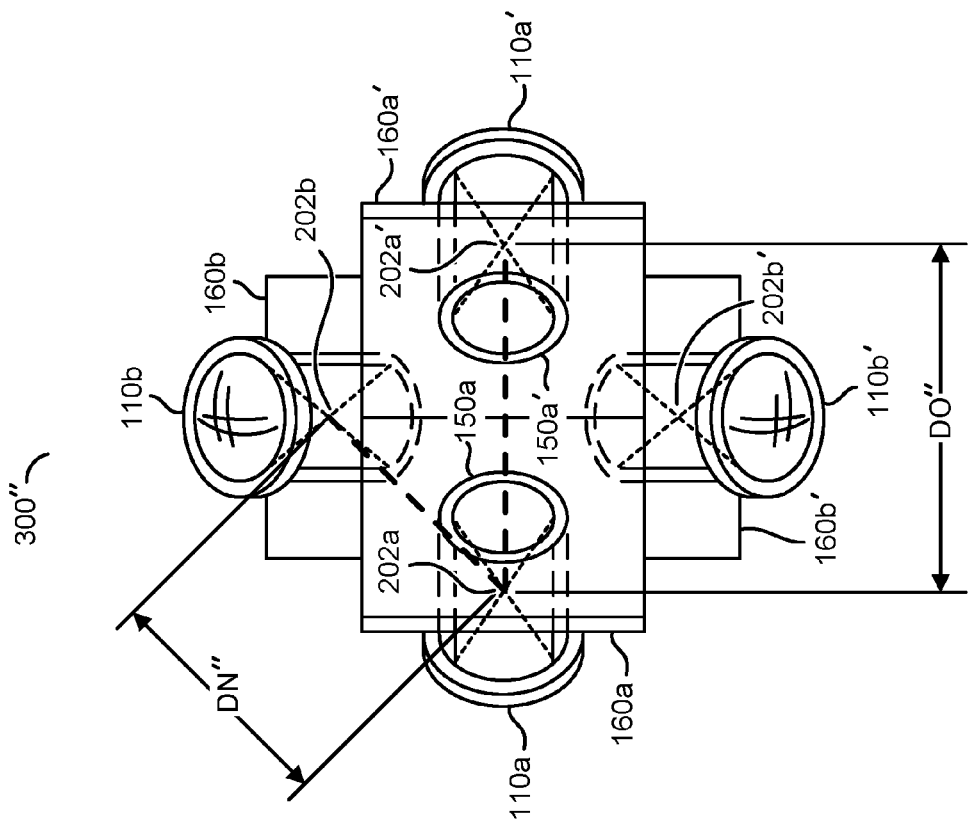
FIG. 16 is a diagram illustrating a top view of the example aligned incline arrangement of lenses.

Referring to FIG. 16, a top view of the example aligned incline arrangement of lenses 300" is shown. The distance DN" is shown between the center of projection 202b of the lens 110b and the center of projection 202a of the lens 110a. The distance DO" is shown between the center of projection 202a of the lens 110a and the center of projection 202a' of the lens 110a'. The optical axes of the neighboring lenses are orthogonal when projected onto a horizontal plane.

Tilting the lenses 110a, 110a', 110b and/or 110b' may reduce the distances between the centers of projection 202a, 202a', 202b and/or 202b'. Tilting the lenses 110a, 110a', 110b and/or 110b' such that the centers of projection 202a, 202a', 202b and/or 202b' all lie on (or close to) a common horizontal plane may further reduce the distances between the centers of projection 202a, 202a', 202b and/or 202b'. For an example, the distance DN" in the arrangement 300 may be smaller than the distance DN' in the arrangement 250. In an example, the distance DO" in the arrangement 300 may be larger than the distance DO' in the arrangement 250. However, to reduce parallax effects, reducing the distance between neighboring lenses (e.g., the distance DN, DN' and/or DN") may have a greater importance than reducing the distance between the opposite lens pairs (e.g., the distance DO, DO' and/or DO").

The example aligned incline arrangement of lenses for reducing parallax effects 300 goes further in removing the vertical parallax between the lenses 110a-110a' and 110b-

110b', by arranging the lenses 110a-110a' and 110b-110b' so that the respective centers of projection 202a, 202a', 202b and 202b' are all located in a common horizontal plane. In an example, the example aligned incline arrangement of lenses for reducing parallax effects 300 may be arranged by inclining the lenses 110a-110a' and 110b-110b' appropriately. In another example, the aligned incline arrangement of lenses for reducing parallax effects 300 may be arranged by sliding the lenses 110a-110a' and 110b-110b' along the camera optical axes 144a-144a' and 144b-144b' until the respective centers of projection 202a, 202a', 202b and 202b' reach the common horizontal plane.

The vertical parallax may be null if:

$$-\frac{B\cos(I)}{2} + (H-T)\sin(I) = 0 \quad (5)$$

Equation (5) may be rewritten as:

$$\tan(I) = \frac{B}{(2(H-T))} \quad (6)$$

Using equation (6), the appropriate angle I to zero-out the vertical parallax and/or the appropriate height H of the lenses 110a-110a' and 110b-110b' may be found. When equation (5) is satisfied, the analytical distance DN" between neighboring cameras becomes:

$$DN'' = \sqrt{2}\left(\text{abs}\left(\frac{B}{2}\sin(I) + H\cos(I)\right)\right) \quad (7)$$

and the distance DO" between the opposite lens pairs remains the same as in equation (4).

There may be two limitations on possible values for the angles I. One limitation for the possible values for the angles I may be the volumes occupied by the camera chambers (e.g., the lens barrel), which may prevent particular angles. When the volumes occupied by the lens barrel is a problem, shifting the lenses 110a-110a' and 110b-110b' on the horizontal plane to split the bases 160a-160a' and 160b-160b' apart may be a solution to allow the centers of projection 202a, 202a', 202b and 202b' to be aligned on a common horizontal plane. For example, in FIG. 16, splitting the bases 160a-160a' and 160b-160b' apart may result in a space between the bases 160a-160a' and 160b-160b'. Splitting the bases 160a-160a' and 160b-160b' apart may result in an increase in the distances of the centers of projection 202a, 202a', 202b and 202b'. However, there would still be the benefits of no vertical parallax.

Another limitation of the possible values for the angles of inclination I may be the field of views (e.g., the respective areas 146a-146a' and 146b-146b' covered) of the various lenses 110a-110a' and 110b-110b'. The angles I may be selected to still have overlap to ensure coverage of a full panorama (e.g., the spherical field of view), despite the inclination angles I.

In the example aligned incline arrangement of lenses for reducing parallax effects 300, the angle of inclination may be I (e.g., the angle Ib shown in FIG. 15). Depending on the actual size of the lenses 110a-110a' and 110b-110b' and the bases 160a-160a' and 160b-160b', the example aligned incline arrangement of lenses for reducing parallax effects 300 may be advantageous for reducing the parallax effects between the neighboring lenses. In an example, where H=600 mm, B=1355 mm and T=100 mm, DN" may be 1275 mm and DO" may be 1802 mm. Other measurements may be determined based on various dimensions of the design criteria of a particular implementation.

Referring to FIG. 17, a perspective view of an example spherical omnidirectional camera 100''' is shown. The example spherical omnidirectional camera 100''' may comprise the lenses 110a-110a' and 110b-110b' and the neck 112. The example spherical omnidirectional camera 100''' may further comprise a lens 352. The lenses 110a-110a' may be one opposite lens pair. The lenses 110b-110b' may be another opposite lens pair.

Referring to FIG. 18, a side view of the example spherical omnidirectional camera 100''' is shown. The lenses 110a-110a' and 110b-110b' are shown arranged around a middle of the spherical omnidirectional camera 100'''. In an example, the lenses 110a-110a' are shown tilted upwards. In an example, the lenses 110b-110b' are shown tilted downwards. The opposite lens pair 110a-110a' and the opposite lens pair 110b-110b' may be tilted in opposite directions. Tilting the opposite lens pairs 110a-110a' and 110b-110b' in opposite directions may reduce the parallax effects by bringing the centers of projection of the lenses 110a-110a' and 110b-110b' closer to a common location. Other arrangements of the lenses 110a-110a' and 110b-110b' may be implemented to reduce parallax effects for the spherical omnidirectional camera 100'''.

Referring to FIG. 19, a top view of the example spherical omnidirectional camera 100''' is shown. The lens 352 may be a supplemental lens. The lens 352 may not be part of a subset of the lenses 110a-110a' and 110b-110b'. In the example shown in FIGS. 17-19, the supplemental lens 352 may capture an additional field of view above the example spherical omnidirectional camera 100'''. In an example, the supplemental lens 352 may provide an additional perspective (e.g., to provide perspective data for a 3D video signal). A location of the supplemental lens 352 may be varied according to the design criteria of a particular implementation.

Figure 20:
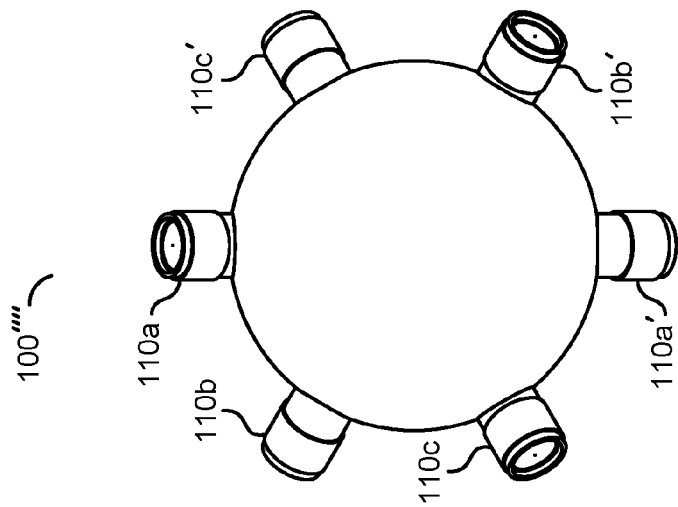
FIG. 20 is a diagram illustrating a perspective view of an example 6-lens spherical omnidirectional camera.

Referring to FIG. 20, a perspective view of an example 6-lens spherical omnidirectional camera 100'''' is shown. The example 6-lens spherical omnidirectional camera 100'''' may comprise the lenses 110a-110a', the lenses 100b-110b' and the lenses 110c-110c' and the neck 112. The lenses 110a-110a' may be one opposite lens pair. The lenses 110b-110b' may be another opposite lens pair. The lenses 110c-110c' may be yet another opposite lens pair.

Figure 21:
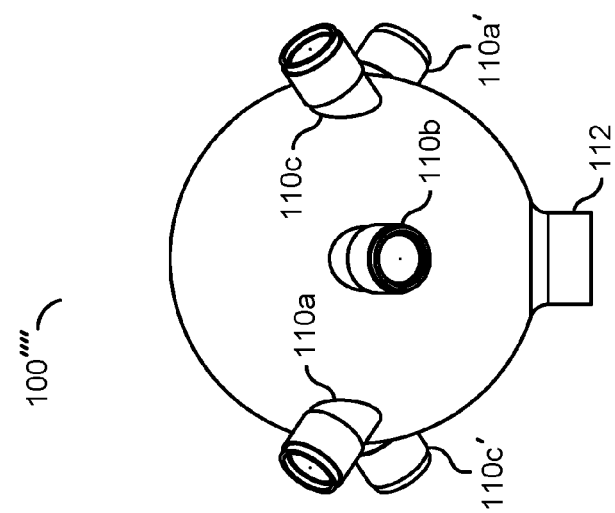
FIG. 21 is a diagram illustrating a side view of the example 6-lens spherical omnidirectional camera.

Referring to FIG. 21, a side view of the example 6-lens spherical omnidirectional camera 100'''' is shown. The lenses 110a-110a', 110b-110b' and 110c-110c' are shown arranged around a middle of the 6-lens spherical omnidirectional camera 100''''. In an example, the lens 110a is shown tilted upwards and the lens 110a' is shown tilted downwards. In an example, the lens 110b is shown tilted downwards and the lens 110b' is shown tilted upwards. In an example, the lens 110c is shown tilted upwards and the lens 110c' is shown tilted downwards. Generally, the lenses 110a-110a', 110b-110b' and 110c-110c' are tilted in alternating directions around the 6-lens spherical omnidirectional camera 100''''. Tilting the lenses in each of the opposite lens pairs 110a-110a', 110b-110b' and 110c-110c' in opposite directions may reduce the parallax effects by bringing the centers of projection of the lenses 110a-110a', 110b-110b' and 110c-110c' closer to a common location. Other arrangements of the lenses 110a-110a', 110b-110b' and 110c-110c' may be implemented to reduce parallax effects for the 6-lens spherical omnidirectional camera 100''''.

Figure 22:
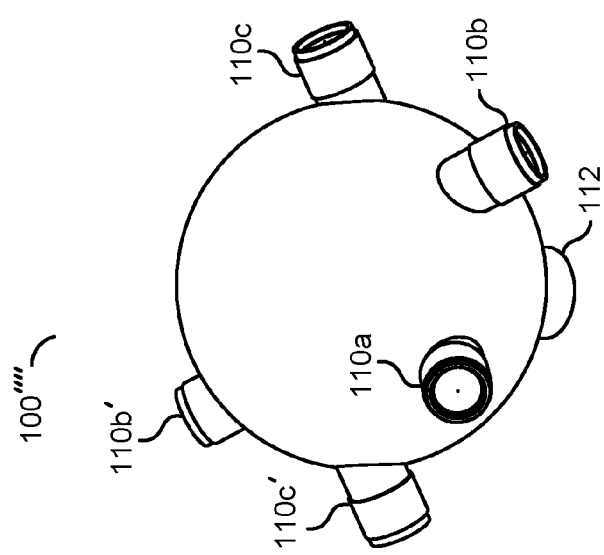
FIG. 22 is a diagram illustrating a top view of the example 6-lens spherical omnidirectional camera.

Referring to FIG. 22, a top view of the example 6-lens spherical omnidirectional camera 100'''' is shown. Adding additional lens pairs may reduce parallax effects between the lenses 110a-110a', 110b-110b' and 110c-110c'. For an example, additional lens pairs may allow a creation of a 3D video signal by providing enough information to generate a depth map. The amount of tilt of each of the lenses 110a-110a', 110b-110b' and/or 110c-110c' may be varied according to the design criteria of a particular implementation.

Referring to FIG. 23, a perspective view of an example 8-lens spherical omnidirectional camera 100''''' is shown. The example 8-lens spherical omnidirectional camera 100''''' may comprise the lenses 110a-110a', the lenses 100b-110b', the lenses 110c-110c' and the lenses 110d-110d' and the neck 112. The lenses 110a-110a' may be one opposite lens pair. The lenses 110b-110b' may be another opposite lens pair. The lenses 110c-110c' may be yet another opposite lens pair. The lenses 110d-110d' may be another opposite lens pair.

Referring to FIG. 24, a side view of the example 8-lens spherical omnidirectional camera 100''''' is shown. The lenses 110a-110a', 110b-110b', 110c-110c' and 110d-110d' are shown arranged around a middle of the 8-lens spherical omnidirectional camera 100'''''. In an example, the lenses 110a-110a' are shown tilted upwards. In an example, the lenses 110b-110b' are shown tilted downwards. In an example, the lenses 110c-110c' are shown tilted upwards. In an example, the lenses 110d-110d' are shown tilted downwards. Generally, the lenses 110a-110a', 110b-110b', 110c-110c' and 110d-110d' are tilted in alternating directions around the 8-lens spherical omnidirectional camera 100'''''. Tilting the opposite lens pairs 110a-110a', 110b-110b', 110c-110c' and 110d-110d' in opposite directions may reduce the parallax effects by bringing the centers of projection of the lenses 110a-110a', 110b-110b', 110c-110c' and 110d-110d' closer to a common location. Other arrangements of the lenses 110a-110a', 110b-110b', 110c-110c' and 110d-110d' may be implemented to reduce parallax effects for the 8-lens spherical omnidirectional camera 100'''''.

Referring to FIG. 25, a top view of the example 8-lens spherical omnidirectional camera 100''''' is shown. Adding additional lens pairs may reduce parallax effects between the lenses 110a-110a', 110b-110b', 110c-110c' and 110d-110d'. For an example, additional lens pairs may allow a creation of a 3D video signal by providing enough information to generate a depth map. The amount of tilt of each of the lenses 110a-110a', 110b-110b', 110c-110c' and/or 110d-110d' may be varied according to the design criteria of a particular implementation.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
 a plurality of lenses (i) arranged to provide coverage for a spherical field of view of a scene surrounding the apparatus and (ii) each having an optical axis directed to provide coverage for a respective area of said spherical field of view; and
 a frame configured to hold (A) a first subset of said plurality of lenses and (B) a second subset of said plurality of lenses, wherein (i) at least one of said lenses in said first subset and at least one of said lenses in said second subset are neighboring lenses, (ii) an orientation of at least two of said neighboring lenses is configured to reduce parallax effects when said spherical field of view is recorded using said plurality of lenses and (iii) said parallax effects are reduced by configuring said optical axes of said neighboring lenses to not intersect.

2. The apparatus according to claim 1, wherein said frame is configured as a unibody design.

3. The apparatus according to claim 1, wherein said frame comprises (i) a first base comprising said first subset of said plurality of lenses and (ii) a second base comprising said second subset of said plurality of lenses.

4. The apparatus according to claim 1, wherein the parallax effects are reduced by positioning a center of projection of each of said plurality of lenses close to a common location.

5. The apparatus according to claim 4, wherein at least one of said lenses in said first subset and one of said lenses in said second subset are tilted to reduce a distance between said centers of projection of said one of said lenses in said first subset and said one of said lenses in said second subset and said common location.

6. The apparatus according to claim 4, wherein said center of projection of one of said plurality of lenses represents a focal point of a camera.

7. The apparatus according to claim 1, wherein said apparatus comprises an optical assembly configured to capture raw data for a plurality of video processors.

8. The apparatus according to claim 1, wherein said lenses in said first subset and said lenses in said second subset are at least one of (a) positioned orthogonally in reference to each other, (b) tilted in vertically opposite directions and (c) displaced in reference to each other.

9. The apparatus according to claim 1, wherein a distance between a center of projection of one of said lenses in said first subset and a center of projection of one of said lenses in said second subset is less than a distance between centers of projection of two of said lenses in said first subset.

10. The apparatus according to claim 9, wherein said distance between said center of projection of one of said lenses in said first subset and said center of projection of one of said lenses in said second subset decreases based on an angle of inclination.

11. The apparatus according to claim 1, wherein centers of projection for said plurality of lenses are all located in a common horizontal plane.

12. The apparatus according to claim 1, wherein said spherical field of view is recorded by performing video stitching operations on video signals captured using said plurality of lenses.

13. The apparatus according to claim 12, wherein said parallax effect causes visual artifacts at overlapping areas of said video signals after performing said video stitching operations.

14. The apparatus according to claim 1, wherein (i) a first lens in said first subset and a second lens in said first subset are aimed in opposite directions along a first axis and (ii) a first lens in said second subset and a second lens in said second subset are aimed in opposite directions along a second axis.

15. The apparatus according to claim 1, wherein said first subset and said second subset each comprise two video cameras.

16. The apparatus according to claim 1, wherein said respective area covered by one of said lenses in said first subset and said respective area covered by one of said lenses in said second subset has an overlapping area.

17. An apparatus comprising a plurality of lenses arranged to:
   (A) provide coverage for a spherical field of view of a scene surrounding the apparatus, wherein (i) each of said plurality of lenses has an optical axis directed to provide coverage for a respective area of said spherical field of view and (ii) any two of said plurality of lenses are considered neighboring lenses when said respective areas covered by said neighboring lenses have an overlapping area; and
   (B) reduce parallax effects associated with said overlapping area when said spherical field of view is recorded using said plurality of lenses, wherein said parallax effects are reduced by configuring said optical axes to not intersect for said neighboring lenses that have a largest size of said overlapping area.

18. The apparatus according to claim 17, wherein said neighboring lenses that have a largest size of said overlapping area are two of said lenses having a distance less than or equal to any other pair of said lenses.

19. An apparatus comprising:
   a plurality of lenses arranged to provide coverage for a spherical field of view of a scene surrounding the apparatus;
   a first base configured to hold (i) a first of said plurality of lenses and (ii) a second of said plurality of lenses; and
   a second base configured to hold (i) a third of said plurality of lenses and (ii) a fourth of said plurality of lenses, wherein (i) said first and second lenses are positioned horizontally opposite on a first axis, (ii) said third and fourth lenses are positioned horizontally opposite on a second axis (iii) said first axis and said second axis are orthogonal with respect to each other and (iv) an orientation of said first lens, said second lens, said third lens and said fourth lens is configured to reduce parallax effects when said spherical field of view is recorded using said plurality of lenses.

20. The apparatus according to claim 19, wherein (i) said horizontally opposite position comprises two of said lenses having an orientation 180 degrees apart when projected to a horizontal plane.

* * * * *